US008896864B2

(12) United States Patent
Haba et al.

(10) Patent No.: US 8,896,864 B2
(45) Date of Patent: Nov. 25, 2014

(54) IMAGE PROCESSING SYSTEM, IMAGE PROCESSING METHOD, IMAGE PROCESSING SERVER, AND RECORDING MEDIUM

(75) Inventors: Shoko Haba, Toyokawa (JP); Taketoshi Yamahata, Toyokawa (JP); Masao Hosono, Toyokawa (JP); Kazuhiro Tomiyasu, Toyokawa (JP); Eiichi Yoshida, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 445 days.

(21) Appl. No.: 13/308,882

(22) Filed: Dec. 1, 2011

(65) Prior Publication Data

US 2012/0140276 A1 Jun. 7, 2012

(30) Foreign Application Priority Data

Dec. 2, 2010 (JP) .................................. 2010-269649

(51) Int. Cl.
*G06F 3/12* (2006.01)
*G06F 9/50* (2006.01)
*H04N 1/00* (2006.01)
*H04N 1/34* (2006.01)

(52) U.S. Cl.
CPC ............ *G06F 9/5027* (2013.01); *G06F 3/1211* (2013.01); *H04N 1/34* (2013.01); *G06F 3/1271* (2013.01); *H04N 1/00244* (2013.01); *G06F 3/1206* (2013.01); *G06F 3/1285* (2013.01); *H04N 2201/0094* (2013.01); *G06F 2209/501* (2013.01); *H04N 2201/001* (2013.01)
USPC ........................................................ 358/1.15

(58) Field of Classification Search
None
See application file for complete search history.

(56) References Cited

U.S. PATENT DOCUMENTS

| 2004/0229611 | A1* | 11/2004 | Chun ............................ 455/434 |
| 2005/0088684 | A1* | 4/2005 | Naito et al. .................. 358/1.15 |
| 2005/0206917 | A1 | 9/2005 | Ferlitsch |
| 2007/0050213 | A1* | 3/2007 | Matsushima et al. ............ 705/3 |
| 2008/0133271 | A1* | 6/2008 | Chang ............................... 705/3 |
| 2009/0204694 | A1* | 8/2009 | Kaneko ......................... 709/223 |

FOREIGN PATENT DOCUMENTS

| JP | 2002-330253 A | 11/2002 |
| JP | 2003-067832 A | 3/2003 |
| JP | 2004-289500 A | 10/2004 |

(Continued)

OTHER PUBLICATIONS

Office Action (Notification of Reasons for Refusal) dated Dec. 4, 2012, issued by the Japanese Patent Office in the corresponding Japanese Patent Application No. 2010-269649 and an English translation thereof. (6 pages).

*Primary Examiner* — Fan Zhang
(74) *Attorney, Agent, or Firm* — Buchanan Ingersoll & Rooney PC

(57) ABSTRACT

A plurality of image processing servers in charge of a first-order service individually transmit their server selection information to a plurality of image processing servers in charge of a second-order service, and those in charge of the second-order service individually select one of those in charge of the first-order service as the most preferred server based on the server selection information received therefrom. Similarly, a plurality of image processing servers in charge of a third-order service individually select one of those in charge of the second-order service as the most preferred server based on the server selection information of those in charge of the second-order service received therefrom. Also similarly, an image forming apparatus selects one of a plurality of image processing servers in charge of the final service as the most preferred server based on the server selection information of those in charge of the final service received therefrom.

19 Claims, 22 Drawing Sheets

(56) References Cited

FOREIGN PATENT DOCUMENTS

| | | | |
|---|---|---|---|
| JP | 2006-195893 A | 7/2006 |
| JP | 2006-319974 A | 11/2006 |
| JP | 2007-058462 A | 3/2007 |
| JP | 2009-129340 A | 6/2009 |

* cited by examiner

Service Information

| Order of Service | Document Image Transfer Port | Information Exchange Port | Name of Service | Reference Item | Charge per Unit |
|---|---|---|---|---|---|
| 1 | http://www.server1a.or.jp/image/ | http://www.server1a.or.jp/com/ | Removing Blank Pages | Number of the target sides of sheets | 10yen |
| 1 | http://www.server1b.or.jp/image/ | http://www.server1b.or.jp/com/ | Removing Blank Pages | Number of the target sides of sheets | 20yen |
| 1 | http://www.server1c.or.jp/image/ | http://www.server1c.or.jp/com/ | Removing Blank Pages | Number of the target sides of sheets | 30yen |
| 2 | http://www.server2a.or.jp/image/ | http://www.server2a.or.jp/com/ | OCR | Detected number of characters | 8yen |
| 2 | http://www.sever2b.or.jp/image/ | http://www.server2b.or.jp/com/ | OCR | Number of the target sides of sheets | 50yen |
| 2 | http://www.server2c.or.jp/image/ | http://www.server2c.or.jp/com/ | OCR | Number of the target sides of sheets | 60yen |
| 3 | http://www.server3a.or.jp/image/ | http://www.server3a.or.jp/com/ | Translation | Number of Characters | 70yen |
| 3 | http://www.server3b.or.jp/image/ | http://www.server3b.or.jp/com/ | Translation | Number of Characters | 80yen |
| 3 | http://www.server3c.or.jp/image/ | http://www.server3c.or.jp/com/ | Translation | Number of Characters | 90yen |

FIG.8

Most Preferred Server

| Image Processing Service | Server | Charge |
|---|---|---|
| Service 1 | — | — |
| Service 2 | — | — |
| Service 3 | — | — |

FIG.9

Estimation Reference Information

| Send-to Server | Reference Item | Confirmed Reference Value |
|---|---|---|
| Server 21a | Number of the target sides of sheets | 20 |
| Server 21b | Number of the target sides of sheets | 20 |
| Server 21c | Number of the target sides of sheets | 20 |

FIG.10

| | Number of the Target Sides of Sheets | Charge per Unit |
|---|---|---|
| Server 21a | 15 | 10yen |
| Server 21b | 17 | 20yen |
| Server 21c | 19 | 30yen |

Estimation Reference Information

| Send-to Server | Reference Item | Confirmed Reference Value |
|---|---|---|
| Server 22a | Detected number of characters | — |
| Server 22b | Number of the target sides of sheets | 15 |
| Server 22c | Number of the target sides of sheets | 15 |

FIG.12b

Estimation Reference Information

| Send-to Server | Reference Item | Confirmed Reference Value |
|---|---|---|
| Server 22a | Detected number of characters | — |
| Server 22b | Number of the target sides of sheets | 17 |
| Server 22c | Number of the target sides of sheets | 17 |

FIG.12c

Estimation Reference Information

| Send-to Server | Reference Item | Confirmed Reference Value |
|---|---|---|
| Server 22a | Detected number of characters | — |
| Server 22b | Number of the target sides of sheets | 19 |
| Server 22c | Number of the target sides of sheets | 19 |

FIG.13a

| Sender Server | Charge |
|---|---|
| Server 21a | 200yen |
| Server 21b | 400yen |
| Server 21c | 600yen |

FIG.13b

Most Preferred Server Information

| Service | Server | Charge |
|---|---|---|
| Service 1 | Server 21a | 200yen |
| Service 2 | — | — |
| Service 3 | — | — |

| Server | Detected number of characters |
|---|---|
| Server 22a | 100 |
| Server 22b | 110 |
| Server 22c | 90 |

Estimation Reference Information

| Send-to Server | Reference Item | Confirmed Reference Value |
|---|---|---|
| Server 23a | Number of characters | 100 |
| Server 23b | Number of characters | 100 |
| Server 23c | Number of characters | 100 |

FIG.15b

Estimation Reference Information

| Send-to Server | Reference Item | Confirmed Reference Value |
|---|---|---|
| Server 23a | Number of characters | 110 |
| Server 23b | Number of characters | 110 |
| Server 23c | Number of characters | 110 |

FIG.15c

Estimation Reference Information

| Send-to Server | Reference Item | Confirmed Reference Value |
|---|---|---|
| Server 23a | Number of characters | 90 |
| Server 23b | Number of characters | 90 |
| Server 23c | Number of characters | 90 |

FIG.16a

| Sender Server | Charge |
|---|---|
| Server 22a | 800yen |
| Server 22b | 750yen |
| Server 22c | 900yen |

FIG.16b

Most Preferred Server Information

| Service | Server | Charge |
|---|---|---|
| Service 1 | Server 21a | 200yen |
| Service 2 | Server 22b | 750yen |
| Service 3 | — | — |

FIG.17a

| Sender Server | Charge |
|---|---|
| Server 23a | 7700yen |
| Server 23b | 8800yen |
| Server 23c | 9900yen |

FIG.17b

Most Preferred Server Information

| Service | Server | Charge |
|---|---|---|
| Service 1 | Server 21a | 200yen |
| Service 2 | Server 22b | 750yen |
| Service 3 | Server 23a | 7700yen |

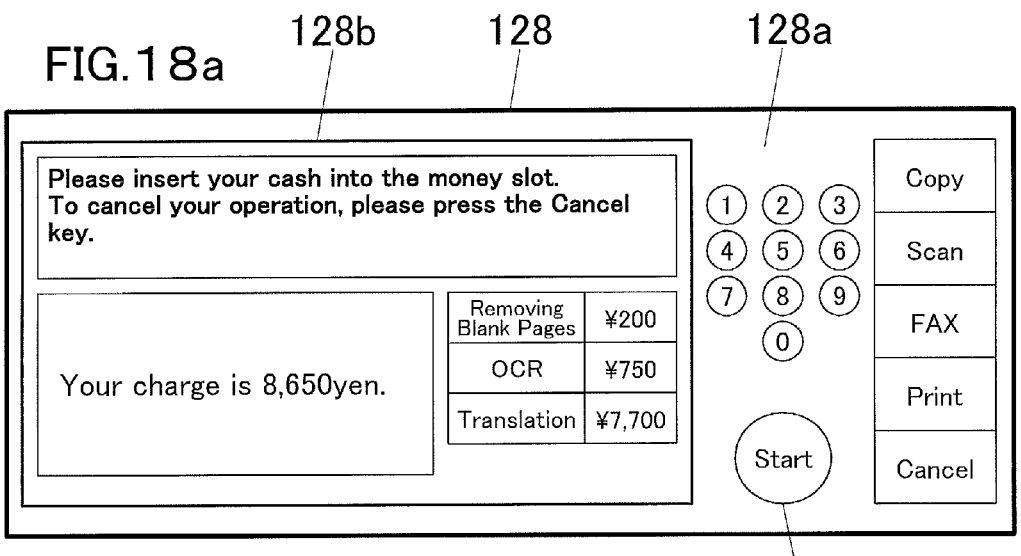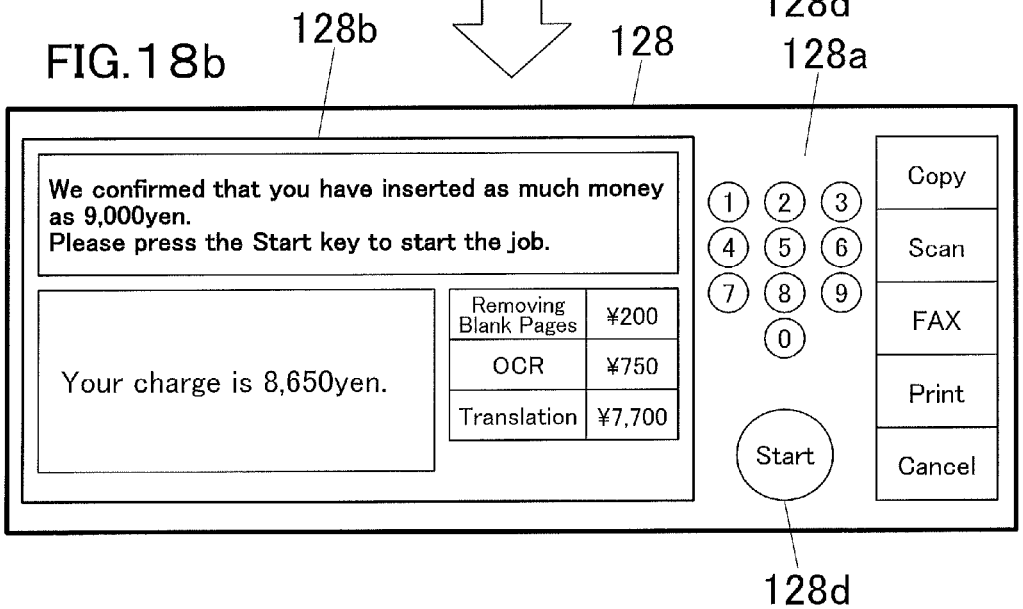

IMAGE PROCESSING SYSTEM, IMAGE PROCESSING METHOD, IMAGE PROCESSING SERVER, AND RECORDING MEDIUM

This application claims priority under 35 U.S.C. §119 to Japanese Patent Application No. 2010-269649 filed on Dec. 2, 2010, the entire disclosure of which is incorporated herein by reference in its entirety.

BACKGROUND OF THE INVENTION

1. Field of the Invention

The present invention relates to: an image processing system in which an image forming apparatus such as a multi-functional digital machine also called as MFP (Multi Function Peripheral) and more than one image processing server are connected to each other via a network; an image processing method for the image processing system; an image processing server preferably employed in the image processing system; and a recording medium with an image processing program being stored thereon to make a computer execute processing.

2. Description of the Related Art

The following description sets forth the inventor's knowledge of related art and problems therein and should not be construed as an admission of knowledge in the prior art.

As well as such an image processing system mentioned above which is configured to make an image forming apparatus perform all image processing operations on image data inputted to the image forming apparatus, there has been a suggested image processing system which is configured to make multiple external image processing servers cooperatively perform their own and different image processing operations on image data inputted to an image forming apparatus (for example, Japanese Unexamined Patent Publications No. 2004-289500 and No. 2009-129340).

In such an image processing system which makes multiple image processing servers with specific functions cooperatively perform their specific operations individually, an image forming apparatus, whose resources are too limited to perform all image processing operations, does not have to employ a complex structure with the capability to perform all these functions, which is very advantageous.

And recently, there has been another suggested image processing system which provides image processing services of various service suppliers via the Web so that users can select their preferred ones among them and obtain their target image via the Web, just like SaaS (Software as a Service).

Also, there has been yet another suggested system which makes a MFP for example, at a convenience store or a print shop, to execute jobs like making a hard copy of a document, transmitting scanned data, and the like, and process cash or prepaid card transactions for the jobs.

For example, Japanese Unexamined Patent Publication No. 2002-330253 discloses a system for processing transactions for multiple processing services collectively. And Japanese Unexamined Patent Publication No. 2003-067832 discloses a system for estimating an amount of charge before performing an image forming service, when a mode is selected for the service. And also, Japanese Unexamined Patent Publication No. 2007-058462 discloses a system for estimating an amount of charge by an estimation server based on the mode or the like set on a MFP and downloading a right estimation program from the estimation server to the MFP.

In such an image processing system as mentioned above, multiple image processing servers may be in charge of image processing services similar to each other, and multiple image processing servers may be in charge of one of multiple image processing services. In this case, there are many possible configurations of image processing servers when a user would like a series of image processing services, and there is a need for a high-performance central server and image forming apparatus being capable of analyzing the information of all the image processing servers so that the user can find a perfect configuration of image processing servers among them all, which has been a problem to resolve.

On the top of that, there has been another problem to resolve in the process how to validate the selected configuration of image processing servers. It is very common for an image processing system to calculate a total cost for a series of image processing services, for example based on the charge information of all the image processing servers which is registered on a transaction processing system as described in Japanese Unexamined Patent Publication No. 2003-067832, by which users are allowed to select image processing services for as small amount of money as possible.

However, it is actually very difficult for users to select image processing services that meets their needs, that is, there sometimes are conflicts between the total cost calculated based on the charge information registered in advance and the actual total cost because an image processing service having been performed may be wrongly affected to another image processing service to be performed next.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

In a first aspect, the present invention relates to an image processing system comprising: an image forming apparatus which outputs target image data; and a plurality of image processing servers which cooperatively perform a series of image processing services in a predetermined order on the target image data originated from the image forming apparatus, while being connected to the image forming apparatus, each of the image processing servers comprising:

an image processor which performs a second-order image processing service on the target image data;

a selection information obtainer which obtains server selection information from all of a plurality of image processing servers in charge of a first-order image processing service;

a server selector which selects one of those in charge of the first-order image processing service as the most preferred server based on the server selection information obtained by the selection information obtainer; and a transmitter which transmits most preferred server information indicating the image processing server in charge of the first-order image processing service, selected as the most preferred server by the server selector; the target image data; and server selection information based on which to select one of a plurality of image processing servers in charge of the second-order image processing service as the most preferred server, to all of a plurality of image processing servers in charge of a third-order image processing service or the image forming apparatus, the image forming apparatus comprising:

a selection information obtainer which obtains server selection information from all of a plurality of image processing servers in charge of the final image processing service; and a server selector which selects one of those in charge of the final image processing service as the most preferred server based on the server selection information obtained by the selection information obtainer.

In a second aspect, the present invention relates to an image processing method for an image processing system comprising: an image forming apparatus which outputs target image data; and a plurality of image processing servers which cooperatively perform a series of image processing services in a predetermined order on the target image data received from the image forming apparatus, while being connected to the image forming apparatus via a network, comprising:

the following steps of each of the image processing server:
performing a second-order image processing service on the target image data;
obtaining server selection information from all of a plurality of image processing servers in charge of a first-order image processing service;
selecting one of those in charge of the first-order image processing service as the most preferred server based on the server selection information obtained; and
transmitting most preferred server information indicating the image processing server in charge of the second-order image processing service, selected as the most preferred server; the target image data; and server selection information based on which to select one of a plurality of image processing servers in charge of the second-order image processing service as the most preferred server, to all of a plurality of image processing servers in charge of a third-order image processing service or the image forming apparatus, and the following steps of the image forming apparatus:
obtaining server selection information from all of a plurality of image processing servers in charge of the final image processing service; and
selecting one of those in charge of the final image processing service as the most preferred server based on the server selection information obtained.

In a third aspect, the present invention relates to an image processing server to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus via a network, comprising:

an image processor which performs a second-order image processing service on the target image data;
a selection information obtainer which obtains server selection information from all of a plurality of image processing servers in charge of a first-order image processing service;
a server selector which selects one of those in charge of the first-order image processing service as the most preferred server based on the server selection information obtained by the selection information obtainer; and
a transmitter which transmits most preferred server information indicating the image processing server in charge of the first-order image processing service, selected as the most preferred server by the server selector; the target image data; and server selection information based on which to select one of a plurality of image processing servers in charge of the second-order image processing service as the most preferred server, to all of a plurality of image processing servers in charge of a third-order image processing service or the image forming apparatus.

In a fourth aspect, the present invention relates to a non-transitory computer-readable recording medium with an image processing program being stored thereon to make a computer of an image processing server to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus via a network, execute:

performing a second-order image processing service on the target image data;
obtaining server selection information from all of a plurality of image processing servers in charge of a first-order image processing service;
selecting one of those in charge of the first-order image processing service as the most preferred server based on the server selection information obtained; and
transmitting most preferred server information indicating the image processing server in charge of the first-order image processing service, selected as the most preferred server; the target image data; and server selection information based on which to select one of a plurality of image processing servers in charge of the second-order image processing service as the most preferred server, to all of a plurality of image processing servers in charge of a third-order image processing service or the image forming apparatus.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 8 is a view illustrating one example of a table of service information;

FIG. 9 is a view illustrating a table of most preferred server information;

FIG. 10 is a view illustrating a table of estimation reference information;

FIG. 11 is a table containing the numbers of the target sides of sheets obtained by the image processing servers in charge of a first-order image processing service which is removing blank pages;

FIGS. 12a, 12b, and 12c are tables of estimation reference information, which are transferred from the image processing servers in charge of the first-order image processing service to the image processing servers in charge of a second-order image processing service;

FIGS. 13a and 13b are a table of charge information and a table of most preferred server information, respectively, which are received from the image processing servers in charge of the first-order image processing service;

FIG. 14 is a table containing the numbers of characters obtained by the image processing servers in charge of a second-order image processing service which is character recognition;

FIGS. 15a, 15b, and 15c are tables of estimation reference information, which are transferred from the image processing servers in charge of the second-order image processing service to the image processing servers in charge of a third-order image processing service;

FIGS. 16a and 16b are a table of charge information and a table of most preferred server information, respectively, which are received from the image processing servers in charge of the second-order image processing service;

FIGS. 17a and 17b are a table of charge information and a table of most preferred server information, respectively, which are received from the image processing servers in charge of the final (third-order) image processing service;

FIG. 18 is a view illustrating a display screen to appear on an operation panel of the image forming apparatus when a transaction is processed;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one mode of implementing the present invention will be described with reference to the accompanying drawings.

Figure 1:
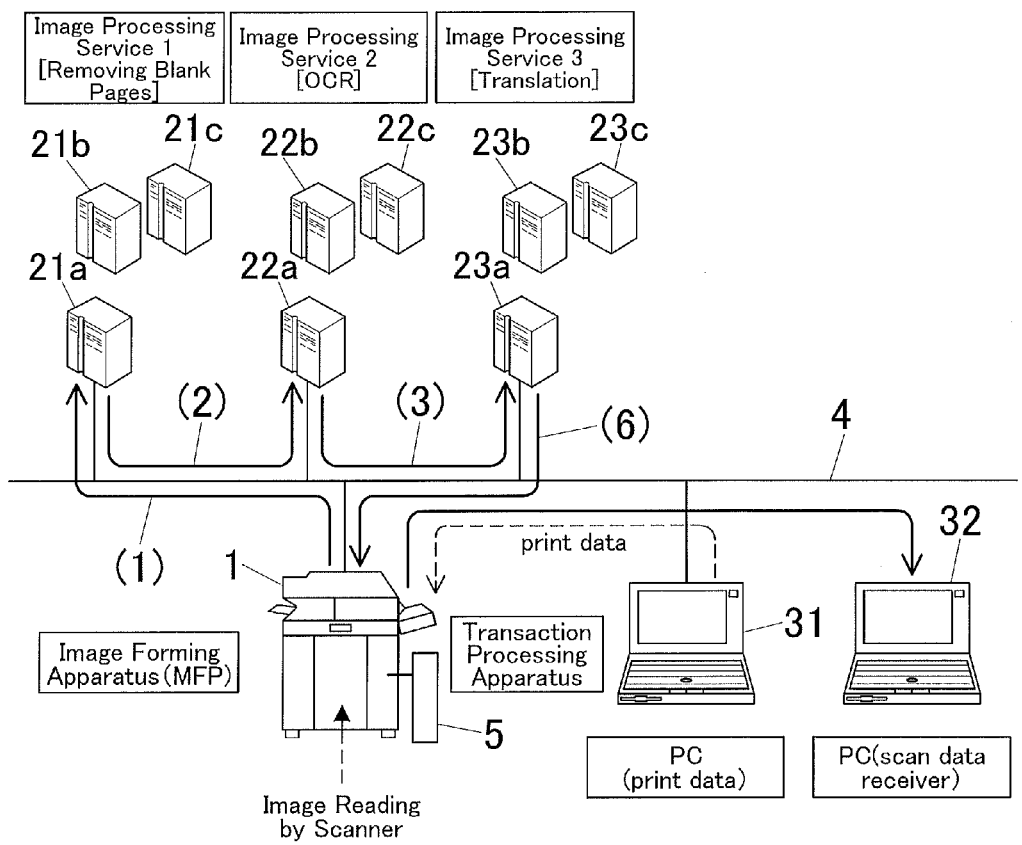
FIG. 1 is a view illustrating a configuration of an image processing system according to one mode of implementing the present invention.

FIG. 1 is a view illustrating a configuration of an image processing system according to one mode of implementing the present invention.

The image processing system is provided with: an image forming apparatus 1; multiple image processing servers (nine servers in this mode of implementation) 21a-21c, 22a-22c, 23a-23c, every three of which belongs to one image processing group (this means three groups in this mode of implementation); and multiple terminals (two terminals in this mode of implementation) 31 and 32 each of which is composed of a persona computer owned by a user, which are connected to each other via a network 4, wherein a transaction processing apparatus 5 is further connected to the image forming apparatus 1.

According to this mode of implementation, the nine image processing servers every three of which belong to the three image processing groups 21 to 25 are configured to perform their responsible image processing services on image data read out from a document by the image forming apparatus 1 or print data received from the terminals 31 and 32, in a predetermined order.

More specifically, the three image processing servers 21a-21c in charge of an image processing service 1 are configured to remove blank pages in the target image data. A charge for this service should be estimated based on the number of the target sides of sheets. That is, the reference item is the number of the target sides of sheets and the reference value is the total number of the target sides of sheets in the target image data. Hereinafter, the target image data also will be referred to as "document image".

The three image processing servers 22a-22c in charge of an image processing service 2 is configured to perform character recognition (OCR) on the document image obtained after removing blank pages. In other words, the image processing servers 22a-22c perform an operation to extract text from the obtained document image and recognize individual characters therein. A charge for this service should be estimated based on the number of characters recognized by the image processing server 22a. That is, the reference item is the number of characters and the reference value is the total number of characters in the target document image. As for the image processing servers 22b and 22c, a charge for this service should be estimated based on the number of the target sides of sheets in the target document image. That is, the reference item is the number of the target sides of sheets and the reference value is the total number of the target sides of sheets in the target document image.

The three image processing servers 23a-23c in charge of an image processing service 3 is configured to perform translation on the document image obtained after removing blank pages then recognizing characters. A charge for this service should be estimated based on the number of characters. That is, the reference item is the number of characters and the reference value is the total number of characters in the target document image.

In this mode of implementation, all the image processing servers 21a-21c, 22a-22c, 23a-23c are configured to perform their own image processing services, and the image processing servers 22a-22c in charge of the image processing service 2 are further configured to select one of the image processing servers 21a-21c in charge of the image processing service 1 as the most preferred server, then transfer the results of selection to the image processing servers 23a-23c.

And the image processing servers 23a-23c in charge of the image processing service 3 are further configured to select one of the image processing servers 22a-22c in charge of the image processing service 2 as the most preferred server, then transfer the results of selection to the image forming apparatus 1.

And the image forming apparatus 1 is configured to select one of the image processing servers 23a-23c in charge of the image processing service 3 which is the last one, as the most preferred server.

In this way as mentioned above, the image processing system is configured to select the most preferred server among those in charge of the image processing services 1-3, respectively. This operation will be later described in detail.

The image forming apparatus 1 is an originator of a document image, which makes the image processing servers 21a-21c, 22a-22c, 23a-23c perform their image processing services by outputting a document image to them. In this mode of implementation, the image forming apparatus 1, as which a MFP, a multifunctional digital machine is employed, has a copier function, a scanner function, a facsimile (also referred to as FAX) function, a printer function, a memory function, and the like.

Figure 2:
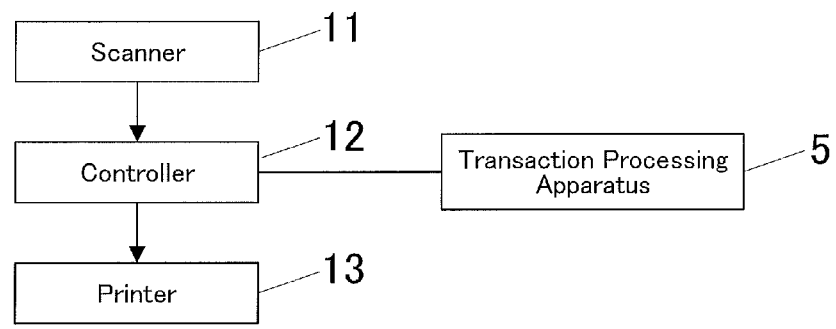
FIG. 2 is a block diagram illustrating a configuration of an image forming apparatus employed in the image processing system of FIG. 1.

FIG. 2 is a block diagram illustrating a configuration of the image forming apparatus 1.

The image forming apparatus 1 is provided with: a scanner 11 for reading an image of a document and converting it to image data, i.e. electronic data; a controller 12 for performing operations on the image data obtained by the scanner 11 and transmitting it to a printer 13; and a printer 13 for printing out on paper image data received from the controller 12.

Figure 3:
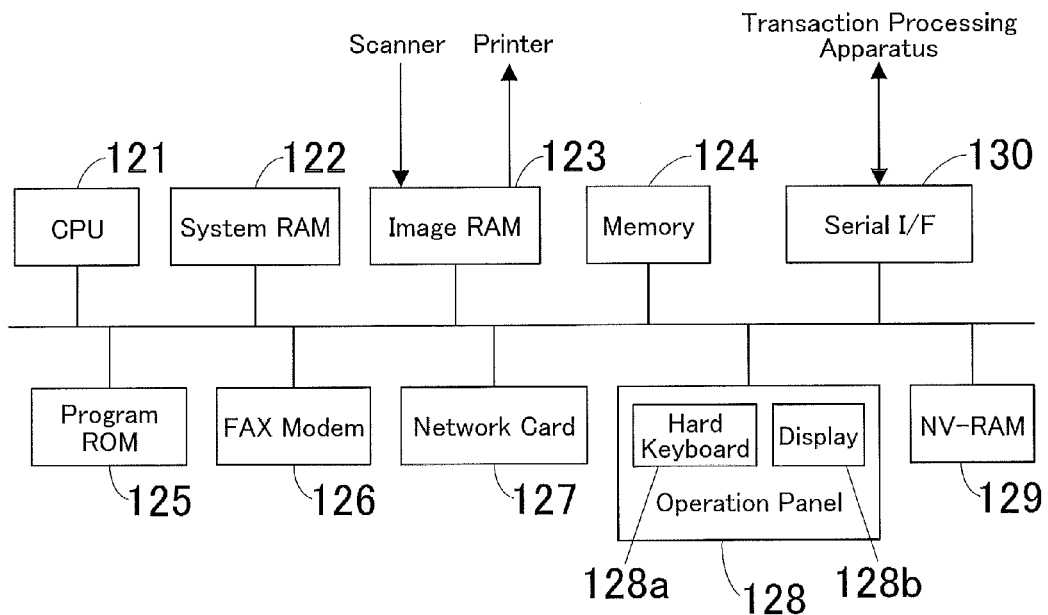
FIG. 3 is a block diagram illustrating a controller of the image forming apparatus in detail.

FIG. 3 is a block diagram illustrating the details of the controller 12 mentioned above.

The controller 12 is provided with: a CPU 121, a system RAM 122, an image RAM 123, a memory 124, a program ROM 125, a FAX modem 126, a network card 127, an operation panel 128, a NV-RAM 129, a serial interface (serial I/F) 130, and the like.

The CPU 121 integrally controls the entire image forming apparatus 1 by executing the various functions of the image forming apparatus 1 including a copier function, a printer function, a FAX function, and the like. Specifically, in this mode of implementation, the CPU 121 further performs the following control operations. The control operations of the CPU 121 includes: generating various types of information necessary for selecting the most preferred server, such as service information indicating the order of multiple image processing services specified by the user and estimation reference information based on which charges for the multiple image processing services are calculated (both of which will be later described); and transmitting the generated information objects and a target document image to the image processing servers 21a-21c in charge of the first image processing service.

The system RAM 122 cumulatively stores necessary data for the CPU 121 to execute operation programs and temporarily keeps a memory area while the operation programs are active.

The image RAM 123 is a memory which temporarily stores image data received from the scanner 11 or the like.

A hard disk drive (HDD), for example, constitutes the memory 124; the memory 124 stores image data received from the scanner 11 or the like, application programs, and other data. Specifically, in this mode of implementation, the memory 124 further stores and registers on itself the details of the available image processing services obtained from the image processing servers 21a-21c, 22a-22c, 23a-23c.

The program ROM 125 is a memory which stores operation programs for the CPU 121. The program ROM 125 further stores programs to control the display and the key input on the operation panel 128, graphic data to display keys on a display 128b of the operation panel 128, "key management information" defining how to react with key presses.

The FAX modem 126 is a device which transmits and receives FAX; the network card 127 serves as a communicator which performs communication with the image processing servers 21a-21c, 22a-22c, 23a-23c and external machines such as the terminals 31 and 32, via the network 4. In this mode of implementation, service information, a document image, and the like are exchanged over HTTP among the image processing servers 21a-21c, 22a-22c, 23a-23c, and also between the image forming apparatus 1 and the image processing servers 21a-21c, 22a-22c, 23a-23c.

The operation panel 128, which is provided with a hard keyboard 128a including a Start key, a Stop key, a numeric keypad, and the like, allows users to operate the image forming apparatus 1; a display 128b, which is a liquid crystal display with touch-panel functionality, displays messages, operation status, and soft keys for users.

The NV-RAM 129 is a memory which stores nonvolatile information and the like specified by users.

The serial I/F 130 is an interface which transmits and receives charging information to and from a transaction processing apparatus 5.

The transaction processing apparatus 5 processes a transaction for an image processing service. In other words, the image forming apparatus 1 calculates the sum of the charges for the image processing services of the image processing servers 21a-21c, 22a-22c, 23a-23c, and displays the calculated amount on the display 128b of the operation panel 128. When the user inputs as much money as displayed into the transaction processing apparatus 5, the transaction processing apparatus 5 starts processing a transaction for his/her specified services.

When a copier function is executed on the image forming apparatus 1, image data obtained by the scanner 11 is temporarily stored on the image RAM 123. And then the image data is transmitted to the printer 13 to be printed out.

When a scanner function is executed on the image forming apparatus 1, image data obtained by the scanner 11 is temporarily stored on the image RAM 123. And the image data is read out by the CPU 121 to be encoded to an all-purpose image form. And then the image data can be externally transmitted over e-mail or FTP from the network card 127.

When a FAX transmitting function is executed on the image forming apparatus 1, image data obtained by the scanner 11 is temporarily stored on the image RAM 123. And the image data is converted to a suitable resolution and a com-pressed form by the CPU 121 so as to be transmitted by FAX, then externally transmitted via the FAX modem 126.

When a FAX receiving function is executed on the image forming apparatus 1, image data received via the FAX modem 126 is temporarily stored on the image RAM 123. And the image data is converted to a suitable form by the CPU 121, then transmitted to the printer 13 to be printed out.

When a printer function is executed on the image forming apparatus 1, a page description language is developed in the image RAM 123 by the CPU 121, then transmitted to the printer 13 to be printed out.

The page description language may be stored on the memory 124 so as to be later printed out as many times as needed. When the user gives an instruction to store image data, image data stored on the image RAM 123 is transferred to the memory 124 to be stored.

The operations of the image forming apparatus 1 as described above, for example reading out image data and printing out print data, will not be further described in detail because they are well-known technologies for the image forming apparatus 1.

Figure 4:
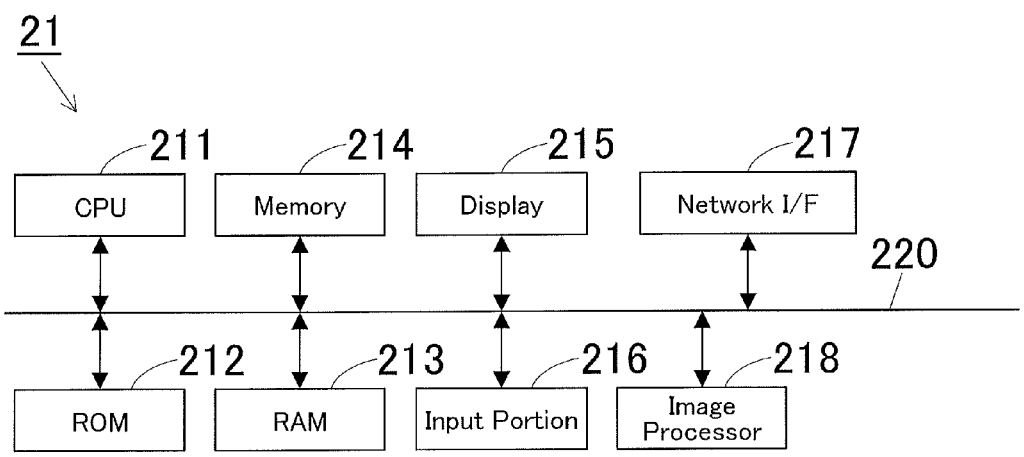
FIG. 4 is a block diagram illustrating a configuration of an image processing server.

FIG. 4 is a block diagram illustrating a configuration of the image processing servers 21a-21c, 22a-22c, 23a-23c. Here, a configuration of the image processing server 21a will be described in detail while a description of the other image processing servers 21b, 21c, 22a-22c, 23a-32c will be omitted, because the image processing servers 21a-21c, 22a-22c, 23a-23c have a common configuration.

An all-purpose computer constitutes the image processing servers 21a; as illustrated in FIG. 4, the image processing server 21a is provided with: a CPU 211; a ROM 212; a RAM 213; a memory 214; a display 215; an input portion 216; a network interface (network I/F) 217; an image processor 218; and the like, all of which are connected to each other via a system bus 220.

The CPU 211 integrally controls the entire image processing server 21a by executing operation programs stored on a recording medium such as the ROM 212. Specifically, in this mode of implementation, the CPU 211 allows the image processor 218 to perform an image processing operation on a document image received from the image forming apparatus 1 or the image processing server in charge of the last image processing operation. And the CPU 211 transfers the image data obtained by the image processing operation, to the image processing server in charge of the next image processing operation. The CPU 211 further performs the following control operations, for example: confirming values based on which a charge for the current or next image processing service is calculated; and selecting one of the image processing servers in charge of the next image processing service as the most preferred server, which will be later described in detail.

The ROM 212 is a recording medium which stores programs and other data for the CPU 211 to execute processing.

The ROM 213 is a recording medium which provides a work area for the CPU 211 to execute processing according to an operation program.

A hard disk drive, for example, constitutes the memory214; the memory 214 stores application programs and other various types of data.

A CRT display or a liquid-crystal display constitutes the display 215; the display 215 displays various messages, entry accepting screens, selection screens, and other screens for users.

The entry portion 216, which serves users to perform input operations, is provided with a keyboard, a mouse, and the like.

The network interface 217 serves as a communicator which transmits and receives data with the image forming apparatus 1, the image processing servers 22 and 23, the terminals 31 and 32, and other external machines, via the network 4.

The image processor 218 performs a predetermined image processing operation on target image data under control of the CPU 211.

The following is the overview of the operations of the image processing system of FIG. 1.

To start with, the image forming apparatus 1 obtains the available image processing services of the image processing servers 21a-21c, 22a-22c, 23a-23c by sending out requests to all of them over HTTP, then registers on itself.

Figure 5:
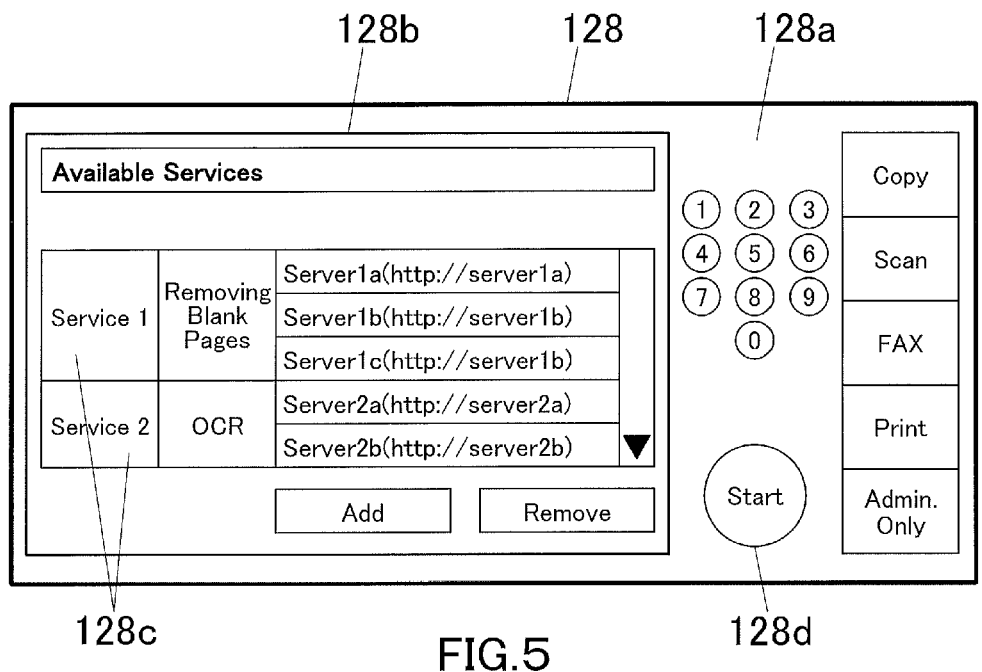
FIG. 5 is a plain view illustrating an operation panel on which keys for selecting an image processing service are displayed.

When the available image processing services are successfully registered on the image forming apparatus 1, keys 128c for selecting image processing services appear on the display 128b of the operation panel 128, as illustrated in FIG. 5. The locations of the image processing servers 21a-21c, 22a-22c, 23a-23c in charge of the respective image processing services are displayed thereon as well.

Figure 6:
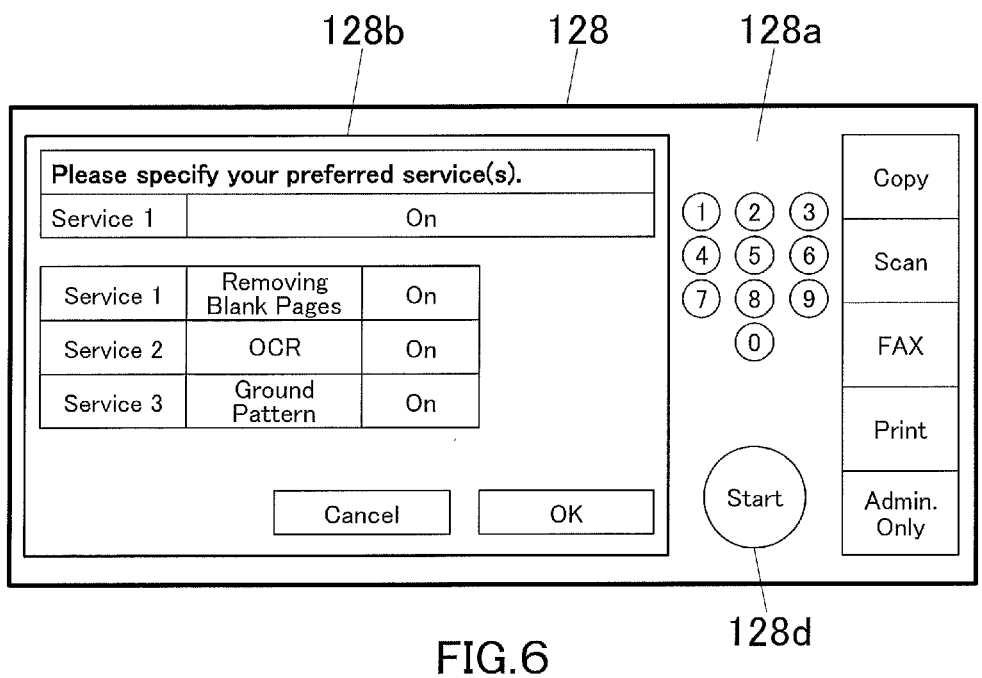
FIG. 6 is a plain view illustrating an operation panel on which a service setting screen is displayed.
Figure 7:
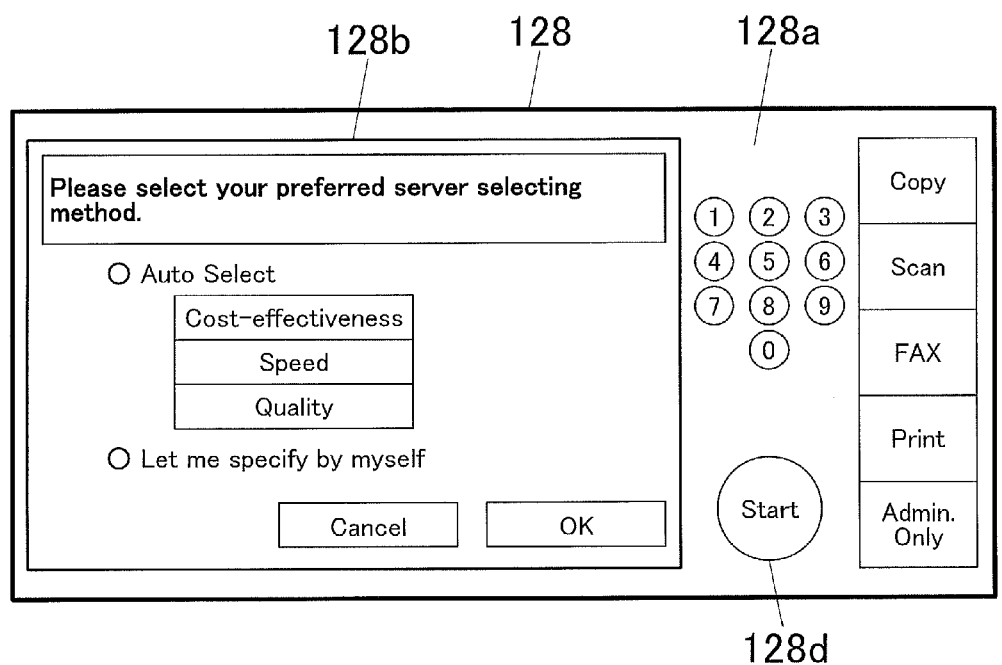
FIG. 7 is a plain view illustrating an operation panel on which a server setting screen is displayed.

The user is allowed to select his/her preferred image processing services via a service setting screen as illustrated in FIG. 6. The image processing services will be performed in the order in which the user selected them via the screen. And the user is also allowed to select a server selecting method based on which to select an image processing server, via a server setting screen as illustrated in FIG. 7. In this mode of implementation, the user can find the following two options: 'Auto Select' and 'Let me specify by myself' in this screen. When proceeding with 'Auto Select', the user is further allowed to select one of the following three priorities, 'Cost-effectiveness', 'Speed', and 'Quality' as a selection criterion. When the user selects any of the priorities, 'Cost-effectiveness', 'Speed', and 'Quality' via the screen, the image forming apparatus 1 starts preparations to enable the selected function.

Specifically when the user selects 'Cost-effectiveness' as a selection criterion, the priority is set to cost-effectiveness; the image forming apparatus 1 automatically selects an image processing server ensuring the lowest charge among a plurality of image processing servers in charge of one image processing service. In this case, the user accordingly will be able to receive a series of his/her selected image processing services at the lowest charge available.

Specifically when the user selects 'Speed' as a selection criterion, the priority is set to processing speed; the image forming apparatus 1 automatically selects an image processing server ensuring the shortest time required for image processing among a plurality of image processing servers in charge of one image processing service. In this case, the user accordingly will be able to finish a series of his/her selected image processing services in the shortest time available.

Specifically when the user selects 'Quality' as a selection criterion, the priority is set to the quality of image processing; the image forming apparatus 1 automatically selects an image processing server which specifications are the most suitable for the next image processing service among a group of multiple image processing servers.

In this way as described above, the user is allowed to select a criterion to select an image processing server so that an image processing server matching this selection criterion will be automatically selected, which means that the image processing system can provide a series of image processing services that best meets the user requirements. The following description relates to the operations to be performed when the user selects 'Cost-effectiveness' as a selection criterion of Auto Select.

When the user presses the Start key 128d, the image forming apparatus 1 starts the operations.

At the time of registration of the available image processing services, the image forming apparatus 1 receives from the image processing servers 21a-21c, 22a-22c, 23a-23c, notices of the "function", "location", "reference value (the number of the target sides of sheets, the number of characters, and the size of document space)", and the like of the available image processing services, then stores them on itself.

The image forming apparatus 1 generates service information which includes all the image processing services that the user selected, and order information indicating the order of the image processing services.

FIG. 8 illustrates one example of service information. In this mode of implementation, service information is a table containing the following items: the order of performing the image processing services; the addresses of the transfer ports of the image processing servers 21a-21c, 22a-22c, 23a-23c in charge of the image processing services, to which a document image is transferred; the addresses of the information exchange ports of the image processing servers 21a-21c, 22a-22c, 23a-23c, to which various types of information other than a document image are transferred; the types of the image processing services; the reference items of the image processing servers 21a-21c, 22a-22c, 23a-23c; and charges per unit. In other words, the service information includes all information from the image processing servers collectively. As shown in the table of service information of FIG. 8, such items about the image processing servers 21a, 21b, 21c, 22a, 22b, 22c, 23a, 23b, and 23c are listed in this order, i.e. from the upper row towards the bottom row.

As well as service information, the image forming apparatus 1 further generates most preferred server information as illustrated in FIG. 9, estimation reference information as illustrated in FIG. 10, and selection criteria information.

The most preferred server information as illustrated in FIG. 9 is a table to refer to an image processing server which is selected as the most preferred server for the 'Cost-effectiveness' among multiple image processing servers in charge of the last image processing service.

The estimation reference information as illustrated in FIG. 10 is a table containing destination addresses, reference items, and confirmed values for the reference items.

The selection criteria information indicates the user's selected priority 'Cost-effectiveness', 'Speed', or 'Quality' according to which the most preferred server will be automatically selected.

The document image obtained by the image forming apparatus 1, the service information, the most preferred server information, the estimation reference information, and the selection criteria information generated by the image forming apparatus 1 are transmitted to each of the image processing servers 21a-21c in charge of the first image processing service, as indicated by Arrow (1) of FIG. 1.

In this mode of implementation, as shown in the table of service information of FIG. 8, the image processing servers 21a-21c, 22a-22c, 23a-23c transmit and receive among themselves, a document image and various types of information such as service information and estimation reference information, separately using their different information exchange ports. In other words, the image forming apparatus 1 transmits a document image and such various types of information to the image processing servers 21a-21c separately via different transfer routes, while the image processing servers 21a-21c, 22a-22c, 23a-23c transmit and receive them among themselves also separately via different transfer routes. More specifically, the image forming apparatus 1 gives to a document image and such various types of information, a job number to identify a series of image processing services which is currently under processing, and transmits them all to the image processing servers 21a-21c.

And the image forming apparatus 1 also confirms the number of sheets when reading a document by the scanner 11, writes a value as the number of the target sides of sheets in the estimation reference information as shown in FIG. 10, and transmits the estimation reference information to the image processing servers 21a-21c.

The image processing servers 21a-21c start the following operations when receiving a document image, service information, most preferred server information, estimation reference information, and selection criteria information from the image forming apparatus 1.

The image processing servers 21a-21c determines a necessary operation for server selection, based on the selection criteria information received therefrom. In this mode of implementation, there is a need to determine a set of image processing servers ensuring the lowest charge (select a transfer route for processing) because 'Cost-effectiveness' is selected as a selection criterion as previously mentioned. Recognizing this, the image processing servers 21a-21c calculate their charges for the image processing service 1 and perform preparations for transferring estimation reference information to the image processing servers 22a-22c in charge of the next image processing service. And the image processing servers 21a-21c store the selection criteria information and the service information if needed, then transfer both of them to the image processing servers 22a-22c in charge of the next image processing service according to the order indicated by the service information. The image processing servers 21a-21c do not need to select the most preferred server among multiple image processing servers in charge of the last image processing service because they are in charge of the image processing service 1 which is the first one. Therefore, the image processing servers 21a-21c transmit the most preferred server information to the image processing servers 22a-22c in charge of the next image processing service without adding any information thereto.

Subsequently, the image processing servers 21a-21c remove blank pages in the document image received from the image forming apparatus 1. After removing blank pages in the document image, the image processing servers 21a-21c transfer the document image to the image processing servers 22a-22c in charge of the next image processing service according to the order indicated by the service information.

Furthermore, the image processing servers 21a-21c calculate their charges for removing blank pages based on their numbers of the target sides of sheets in the estimation reference information received from the image forming apparatus 1. For example, as for the image processing server 21a, being provided with 10 yen as the charge per unit and 20 as the number of the target sides of sheets according to the service information and the estimation reference information, respectively, the charge for this service equals 200 yen.

Similarly, as for the image processing server 21b, being provided with 20 yen as the charge per unit and 20 as the number of the target sides of sheets according to the service information and the estimation reference information, respectively, the charge for this service equals 400 yen.

Also similarly, as for the image processing server 21c, being provided with 30 yen as the charge per unit and 20 as the number of the target sides of sheets according to the service information and the estimation reference information, respectively, the charge for this service equals 600 yen.

And the image processing servers 21a-21c transfer the charge information indicating these calculated amounts, as server selection information, to the image processing servers 22a-22c in charge of the next image processing service.

While removing blank pages as the image processing service 1, the image processing servers 21a-21c extract image specification information from the document image. And when confirming the reference values for the image processing servers 22a-22c in charge of the image processing service 2, the image processing servers 21a-21c write the confirmed values in estimation reference information and transfer the estimation reference information to the image processing servers 22a-22c. Although the reference item of the image processing server 22a is the number of characters which is supposed to be obtained by character recognition, the image processing servers 21a-21c are not capable of confirming such a number. Therefore, the image processing servers 21a-21c transmit the estimation reference information to the image processing server 22a without adding any information to the relevant field.

For example, if the numbers of the target sides of sheets obtained after removing blank pages: 15, 17, and 19, are confirmed by the image processing servers 21a-21c as shown in the table of FIG. 11, respectively, the image processing server 21a transmits the estimation reference information as shown in FIG. 12a to the image processing servers 22a-22c in charge of the next image processing service. And the estimation reference information includes the reference items of the image processing servers 22a-22c and the reference values for the items. Specifically, the number of the target sides of sheets, 15, confirmed by the image processing server 21a, is written in the corresponding column of the image processing servers 22b and 22c. And there is no confirmed value in the corresponding column of the image processing server 22a because the number of characters is supposed to be obtained by character recognition as mentioned above.

Similarly, the image processing server 21b transmits the estimation reference information as shown in FIG. 12b to the image processing servers 22a-22c in charge of the next image processing service; specifically, the number of the target sides of sheets, 17, confirmed by the image processing server 21b, is written in the corresponding column of the image processing servers 22b and 22c.

Also similarly, the image processing server 21c transmits the estimation reference information as shown in FIG. 12c to the image processing servers 22a-22c in charge of the next image processing service; specifically, the number of the target sides of sheets, 19, confirmed by the image processing server 21c, is written in the corresponding column of the image processing servers 22b and 22c.

The image processing servers 22a-22c start the following operations when receiving a document image, selection criteria information, service information, most preferred server information, estimation reference information, and charge information from the image processing servers 21a-21c.

The image processing servers 22a-22c perform server selection, i.e. select the image processing server 21a, 21b, or 21c in charge of the image processing service 1 as the most preferred server based on the selection criteria information which is received. In this mode of implementation, there is a need to select a server ensuring the lowest charge among the image processing servers 21a-21c in charge of the image processing service 1, because 'Cost-effectiveness' is selected as a selection criterion.

In other words, the image processing servers 22a-22c perform server selection by examining the charge information received from the image processing servers 21a-21c in charge of the image processing service 1.

FIG. 13a is a table of charge information from the image processing servers 21a-21c. The image processing servers 22a-22c select the image processing server 21a with the lowest charge among the image processing servers 21a-21c in charge of the image processing service 1. And the image processing servers 22a-22c write the image processing server 21a and the amount of charge calculated, 200 yen, in the corresponding columns of the image processing service 1 in the most preferred server information as shown in FIG. 13b, then transfer the most preferred server information to the image processing servers 23a-23c according to the order indicated by the service information. The image processing servers 22a-22c store the selection criteria information and the service information if it is necessary, and then transfer both of them to the image processing servers 23a-23c along with or not along with the most preferred server information.

Subsequently, the image processing servers 22a-22c perform character recognition as the image processing service 2 on the document image received from the image processing server 21 which is selected as the most preferred server. After the image processing service 2, the image processing servers 22a-22c transfer the document image to the image processing servers 23a-23c in charge of the next image processing service according to the order indicated by the service information.

Furthermore, the image processing server 22a-22c further calculate their charges for character recognition based on the estimation reference information received from the image processing server 21a which is selected as the most preferred server.

There is no confirmed value for the image processing server 22a in the estimation reference information received from the image processing server 21a, because the number of characters is supposed to be obtained by character recognition. That is the reason why the image processing servers 22a-22c need to store the number of characters obtained by character recognition to calculate their charges. For example, being provided with 100 as the number of characters obtained by character recognition and 8 yen as the charge per unit according to the service information, the charge for this service equals 800 yen.

The image processing server 22b calculates its charge for this service based on the number of the target sides of sheets, which is the confirmed value, 15 for example, in the estimation reference information received from the image processing server 21a. Further being provided with 50 yen as the charge per unit according to the service information, the charge for this service equals 750 yen.

The image processing server 22c also calculates its charge for this service based on the number of the target sides of sheets, which is the confirmed value, 15 for example, just like the image processing server 22b. Further being provided with 60 yen as the charge per unit according to the service information, the charge for this service equals 900 yen.

And the image processing servers 22a-22c transfer the charge information indicating these calculated amounts, to the image processing servers 23a-23c in charge of the next image processing service.

While performing character recognition as the image processing service 2, the image processing servers 22a-22c detect the reference items based on which the image processing servers 23a-23c calculate their charges, if it is possible. In this mode of implementation, it is possible for the image processing servers 22a-22c to detect the number of characters based on which the image processing servers 23a-23c in charge of the next image processing service will calculate their charges for this service. And when confirming the reference values for the image processing servers 23a-23c, the image processing servers 22a-22c write the confirmed values in the estimation reference information and transfer the estimation reference information to the image processing server 23a-23c.

For example, if the numbers of characters detected by character recognition: 100, 110, and 90, are confirmed by the image processing servers 22a-22c as shown in the table of FIG. 14, respectively, the image processing server 22a transmits the estimation reference information as shown in FIG. 15a to the image processing servers 23a-23c in charge of the next image processing service. And the estimation reference information includes the reference item of the image processing servers 23a-23c and the reference value for the item; specifically, the number of characters, 100, confirmed by the image processing server 22a, is written in the corresponding column of the image processing servers 23a-23c.

Similarly, the image processing server 22b transmits the estimation reference information as shown in FIG. 15b to the image processing servers 23a-23c in charge of the next image processing service; specifically, the number of characters, 110, confirmed by the image processing server 22b, is written in the corresponding column of the image processing servers 23a-23c.

Also similarly, the image processing server 22c transmits the estimation reference information as shown in FIG. 15c to the image processing servers 23a-23c in charge of the next image processing service; specifically, the number of pages, 90, confirmed by the image processing server 22c, is written in the corresponding column of the image processing servers 23a-23c.

The image processing servers 23a-23c start the following operations when receiving a document image, selection criteria information, service information, most preferred server information, estimation reference information, and charge information from the image processing servers 22a-22c.

The image processing servers 23a-23c perform server selection, i.e. select one of the image processing servers 22a-22c in charge of the image processing service 1 as the most preferred server based on the selection criteria information which is received. In this mode of implementation, there is a need to select a server ensuring the lowest charge among the image processing servers 22a-22c in charge of the image processing service 2, because 'Cost-effectiveness' is selected as a selection criterion.

In other words, the image processing servers 23a-23c perform server selection by examining the charge information received from the image processing servers 22a-22c in charge of the image processing service 2.

FIG. 16a is a table of charge information from the image processing servers 22a-22c. The image processing servers 23a-23c select the image processing server 22b with the lowest charge among the image processing servers 22a-22c in charge of the image processing service 2. And the image processing servers 23a-23c write the image processing server 22b and the amount of charge calculated, 750 yen, in the corresponding columns of the image processing service 2 in the most preferred server information as shown in FIG. 16b, then transfer the most preferred server information to the image forming apparatus 1, the final destination according to the order indicated by the service information, along with or not along with the selection criteria information and the service information.

Subsequently, the image processing servers 23a-23c perform translation as the image processing service 3 on the document image received from the image processing server 22b which is selected as the most preferred server. After the image processing service 3, the image processing servers 23a-23c transfer the document image to the image forming apparatus 1, the final destination according to the order indicated by the service information.

Furthermore, the image processing server 23a-23c further calculate their charges for translation based on the estimation reference information received from the image processing server 22b which is selected as the most preferred server.

The image processing servers 23a-23c calculates their charges for this service based on the number of characters, which is the confirmed value, 110, in the estimation reference information received from the image processing server 22b. Further being provided with 70 yen, 80 yen, and 90 yen as their charges per unit according to the service information, their charges for this service equal 7700 yen, 8800 yen, and 9900 yen, respectively.

And the image processing servers 23a-23c transfer the charge information indicating these calculated amounts to the image forming apparatus 1.

The image processing servers 23a-23c do not need to transfer the estimation reference information to the image forming apparatus 1 because they are in charge of the image processing service 3 which is the last one. The image processing servers 23a-23c do not either need to transfer the selection criteria information and the service information to the image forming apparatus 1.

Receiving at least, the document image, the most preferred server information, and the charge information from the image processing servers 23a-23c in charge of the image processing service 3 which is the last one, the image forming apparatus 1 selects an image processing server ensuring the lowest charge among the image processing servers 23a-23c, based on the selection criterion set on the image forming apparatus 1, 'Cost-effectiveness'.

In other words, the image forming apparatus 1 performs server selection by examining the charge information received from the image processing servers 23a-23c in charge of the image processing service 3 which is the last one.

FIG. 17a is a table of charge information from the image processing servers 23a-23c. The image forming apparatus 1 selects the image processing server 23a with the lowest charge among the image processing servers 23a-23c, as the most preferred server. And the image forming apparatus 1 writes the image processing server 23a and the amount of charge calculated, 7700 yen, in the corresponding columns of the image processing service 3 in the most preferred server information as shown in FIG. 17b. In this way as described above, a set of image processing servers (a transfer route for processing) and a total charge for the image processing services 1-3 have been determined.

If 'Speed' is selected as a selection criterion, an image processing server receives server selection information including information indicating the times required (estimated duration) for performing the last image processing service on a document image from those in charge of the last image processing service. And the image processing servers selects an image processing server ensuring the shortest time required for image processing among those three in charge of the last image processing service, as the most preferred server. In this case, it does not always mean that those in charge of the last image processing service need to always perform their responsible image processing service on a document image in order to obtain the times required for that. It may be configured such that an image processing server or the image forming apparatus 1 selects one of those in charge of the last image processing service as the most preferred server when receiving a notice of the estimated times required for image processing therefrom, and after that, the image processing server selected as the most preferred server actually performs its responsible image processing service. Alternatively, an image processing server from which a document image is received the earliest may be selected as the most preferred server among those in charge of the last image processing service.

In another case, if 'Speed' is selected as a selection criterion, an image processing server ensuring the shortest time required for image processing may be selected as the most preferred server among those three in charge of the last image processing service; an image processing server holding the smallest number of jobs in the queue may be selected as the most preferred server among them, by comparing the job queue status of those three in charge of the last image processing service. Also in this case, after such an image processing server is selected as the most preferred server, the image processing server selected as the most preferred server actually performs its responsible image processing service. Alternatively, an image processing server which would finish its responsible image processing service the earliest may be selected as the most preferred server among those in charge of the last image processing service, based on both their estimated times and their job queue status.

In the other case, if 'Quality' is selected as a selection criterion, an image processing server which would make the best match with the present image processing server in terms of image quality is selected as the most preferred server among those in charge of the last image processing service, based on the server selection information indicating the results of performing the last image processing service on a test pattern (an image as test data). In this case, an image processing server or the image forming apparatus 1 receives a notice of the results of performing a test operation from those in charge of the last image processing service.

Alternatively, an image processing server or the image forming apparatus 1 may hold in advance a test pattern to transmit to those in charge of the last or the last image processing service, respectively, according to their request or the like. For example, in the case where an image processing server performs character recognition as its responsible image processing service after an image processing server in charge of the last image processing service performs an operation to merge a QR code or string to a document image, there is a possibility that the present image processing server may fail character recognition depending on the position on the document image where a QR code of string is given, or the method of the data merging operation. To prevent such a trouble, those in charge of the last image processing service need to perform a data merging operation on a test pattern so that the present image processing server can select an image processing server which would not adversely affect character recognition among those in charge of the last image processing service, based on the results of the test operation.

Alternatively, the present image processing server may need to select an image processing server which would make the present image processing server's charge the lowest or which would make the present image processing server's time required for image processing the shortest, among those in charge of the last image processing service, based on the results of the test operation. For example, in the case where an image processing server estimates the charge for its responsible image processing service based on the number of the target sides of sheets after an image processing server in charge of the last image processing service removes blank pages, the present image processing server needs to select an image processing server which obtains the smallest number of the target sides of sheets by removing blank pages, among those in charge of the last image processing service, based on the results of the test operation.

As described above, in this mode of implementation, under the condition that a plurality of image processing servers in charge of different image processing services cooperatively perform a series of image processing services in a predetermined order on image data originated from the image forming apparatus, a plurality of image processing servers in charge of one image processing service individually select one of those in charge of the last image processing service and the image forming apparatus selects one of those in charge of the final image processing service, as the most preferred servers, which allows arranging one set of most preferred servers even without a need for a high-performance central server or image forming apparatus. In this mode of implementation, an image processing server or the image forming apparatus 1 select(s) one of those in charge of the last image processing service as the most preferred server. And even if there is a possibility that an image processing service may be adversely affected by the last image processing service, a right option is always selected among those in charge of the last image processing service, based on helpful information.

After that, the image forming apparatus 1 calculates the sum of the amounts of charge for all the image processing services which are written in the most preferred server information, and makes the transaction processing apparatus 5 to process a transaction to charge the calculated amount. More specifically, the image forming apparatus 1 accesses the transaction processing apparatus 5 which is connected to the serial interface 130 to transmit thereto a notice of the calculated amount (the charge for the entire series of image processing services), and displays for the user, the calculated amount and a message requesting the user to enter as much money as the calculated amount on the display 128*b* of the operation panel 128, as illustrated in FIG. 18*a*. When the user inputs as much money as displayed into the transaction processing apparatus 5, the transaction processing apparatus 5 starts processing a transaction, and the image forming apparatus 1 switches the current screen to another screen as illustrated in FIG. 18*b*, on the display 128*b* of the operation panel 128. When the user presses the Start key 128*d*, the image forming apparatus 1 starts printing the document image obtained by the image processing service or transmitting it to a certain address.

Hereinafter, the operations of the image forming apparatus 1 and the image processing servers 21*a*-21*c*, 22*a*-22*c*, 23*a*-23*c* will be further described with reference to some flowcharts.

The image forming apparatus 1 performs all operations under control of the CPU 121 according to operation programs stored on the program ROM 125 as described above.

Figure 19:
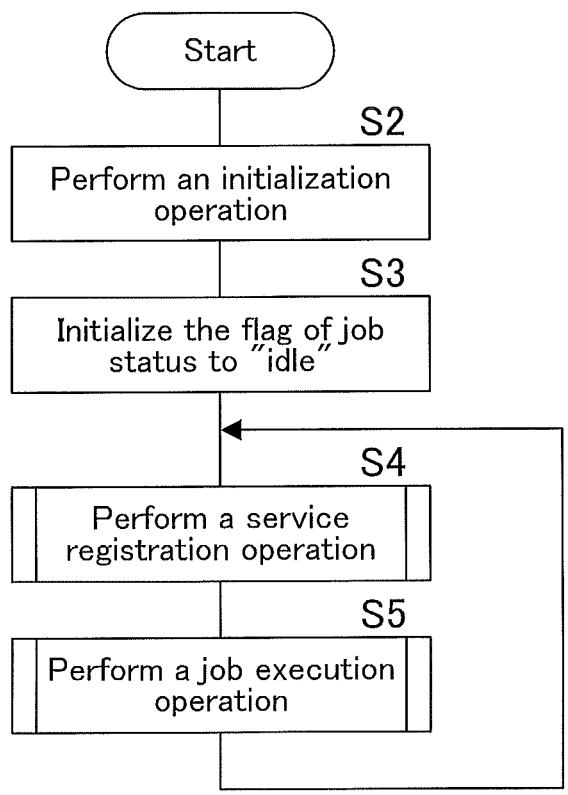
FIG. 19 is a flowchart representing a main processing routine of the image forming apparatus.

As illustrated in FIG. 19, when being provided with power, the image forming apparatus 1 performs an initialization operation, for example initializes the hardware and the like (Step S2). Subsequently, the image forming apparatus 1 initializes 'job status' representing the status of the job to 'idle' (Step S3), registers the available image processing services of the image processing servers 21*a*-21*c*, 22*a*-22*c*, 23*a*-23*c* on the image forming apparatus 1 itself (Step S4), and runs the job (Step S5). And the image forming apparatus 1 repeats the operation of registering the available image processing services (Step S4) and the operation of running the job (Step S5).

Figure 20:
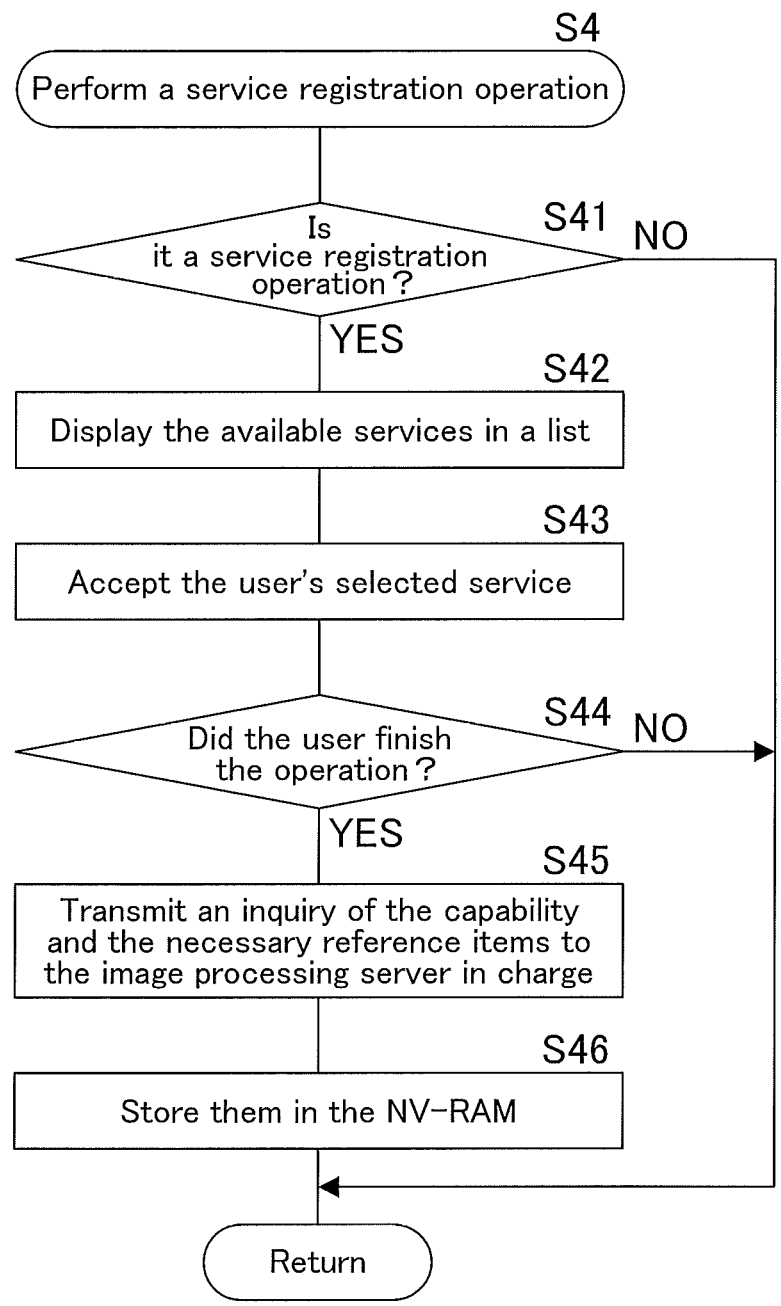
FIG. 20 is a flowchart representing a sub processing routine corresponding to a service registration operation (Step S4) in FIG. 19.

FIG. 20 is a flowchart representing a sub processing routine corresponding to a service registration operation (Step S4) in FIG. 19. It should be noted that an administrator user is required to preliminarily register the available image processing services on the image forming apparatus 1.

In Step S41, it is judged whether or not what is intended via the operation panel 128 is a service registration operation. If it is not a service registration operation (NO in Step S41), the sub processing routine returns to the main processing routine. If it is a service registration operation (YES in Step S41), the available image processing services having been registered on the image forming apparatus 1 appear in a list (the registered items can be updated) in Step S42. The user selects a desirable image processing service, then the selected image processing service is accepted in Step S43. And according to user manipulation, it is judged whether or not the selection is finished in Step S44. If the selection is not finished (NO in Step S44), the sub processing routine returns to the main processing routine. If the selection is finished (YES in Step S44), an inquiry of the capability about the selected image processing service and the necessary reference items for transaction processing is transmitted to the image processing server in charge in Step S45, and the obtained information is stored on the NV-RAM 129 in Step S46.

Figure 21:
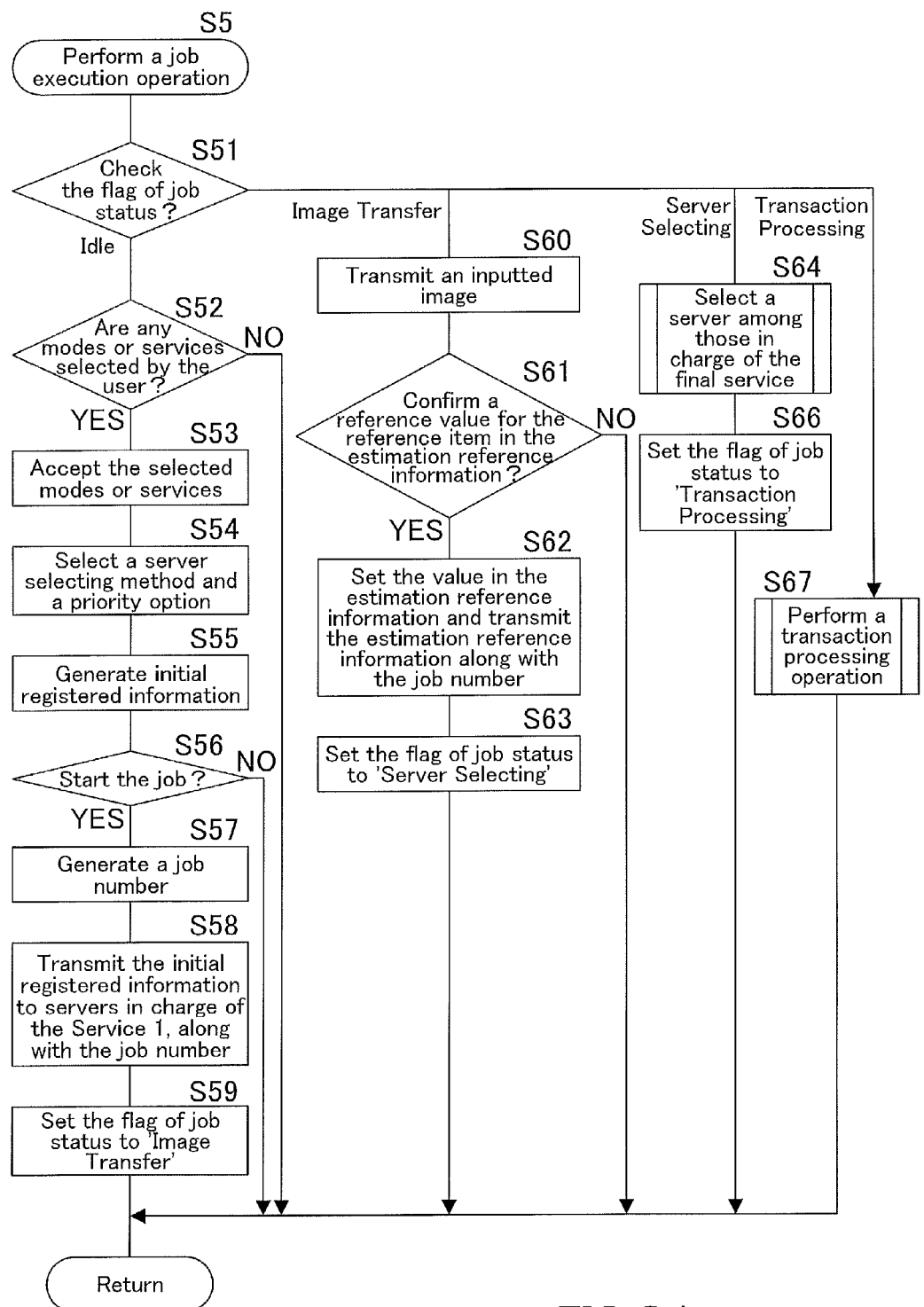
FIG. 21 is a flowchart representing a sub processing routine corresponding to a job execution operation (Step S5) in FIG. 19.

FIG. 21 is a flowchart representing a sub processing routine to select a series of image processing services and execute a job, corresponding to the job execution operation (Step S5) in FIG. 19.

The flag of 'job status' is checked out, and the sub processing routine proceeds to different steps depending on the job status: 'idle', 'image transfer', or 'transaction processing', in Step S51.

If the flag of 'job status' is 'idle' in Step S51, it is judged in Step S52 whether or not any mode or a series of image processing services are selected by the user via the operation panel 128. If any mode or a series of image processing services is selected (NO in Step S52), the sub processing routine returns to the main processing routine. If any mode or a series of image processing services is selected (YES in Step S52), and the selected mode or series of image processing services is accepted by the operation panel 128 in Step S53. When the user selects 'Auto Select' as a server selecting method, and further selects 'Cost-effectiveness', 'Speed', or 'Quality' as the priority, the priority is set to the selected option is Step S54.

Subsequently, service information, selection criteria information, and most preferred server information are generated in Step S55. Hereinafter, service information, selection criteria information, and most preferred server information will be collectively referred to as initial registered information.

And in Step S56, it is judged whether or not the Start key is pressed by the user, in other words, there is an instruction to start the job. If there is not such an instruction yet (NO in Step S56), the sub processing routine returns to the main processing routine. If there is an instruction to start the job (YES in Step S56), a job number is generated in Step S57, and the sub processing routine proceeds to Step S58, in which the initial registered information generated in Step S55 is transmitted to the image processing servers 21*a*-21*c* in charge of the image processing service 1, along with the job number. After that, the flag of job status' is switched to 'image transfer' in Step S59, and the sub processing routine returns to the main processing routine.

If the flag of 'job status' is 'image transfer' in Step S51, the sub processing routine proceeds to Step S60, in which an inputted document image is transmitted to the network. The inputted document image may be image data read out from a document by the scanner 11 or print image received from the terminal 31 or 32.

After the transmission, it is judged in Step S61 whether or not a reference value for the reference item in the estimation reference information is confirmed. If it is not confirmed yet (NO in Step S61), the sub processing routine returns to the main processing routine. If it is confirmed already (YES in Step S61), the sub processing routine proceeds to Step S62, in which the confirmed reference value is written in the estimation reference information and the estimation reference information is transmitted to the image processing servers 21*a*-21*c*, along with the job number.

After that, the flag of 'job status' is switched to 'selecting server' in Step S63, and the sub processing routine returns to the main processing routine.

If 'job status' is 'selecting server' in Step S51, the sub processing routine proceeds to Step S64, in which an image processing server is selected among those in charge of the final image processing service. After that, the flag of 'job status' is switched to 'transaction processing' in Step S66, and the sub processing routine returns to the main processing routine.

If the flag of 'jog status' is 'transaction processing' in Step S51, the sub processing routine proceeds to Step S67 to perform a transaction processing operation, then returns to the main processing routine.

Figure 22:
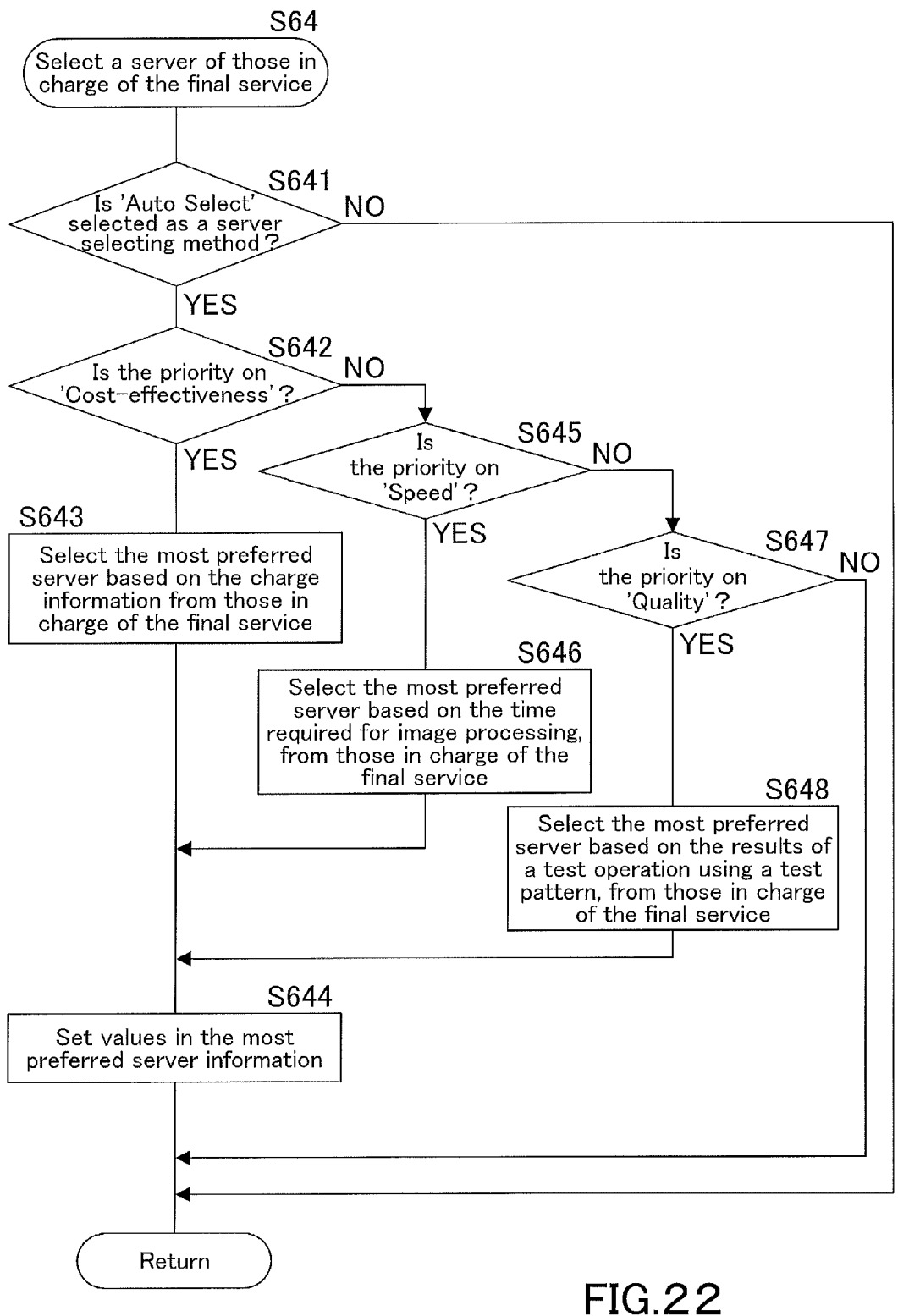
FIG. 22 is a flowchart representing a sub processing routine corresponding to the final image processing service, a server selection operation (Step S64) in FIG. 21.

FIG. 22 is a flowchart representing a sub processing routine corresponding to the transaction processing operation (Step S64) in FIG. 21.

In Step S641, it is judged whether or not 'Auto Select' is selected as a server selecting method. If it is not 'Auto Select' (NO in Step S641), the sub processing routine returns to the last processing routine.

If it is 'Auto Select' (YES in Step S641), the sub processing routine proceeds to Step S642, in which it is judged whether or not 'Cost-effectiveness' is selected as a selection criterion. If it is 'Cost-effectiveness' (YES in Step S642), the sub processing routine proceeds to Step S643, in which an image processing server ensuring the lowest charge is selected among the image processing servers 23*a*-23*c* in charge of the image processing service 3, as the most preferred server, by comparing their charge information received. After that, the sub processing routine proceeds to Step S644.

In Step S642, if it is not 'Cost-effectiveness', the sub processing routine proceeds to Step S645, in which it is judged whether or not 'Speed' is selected as a selection criterion. If it is 'Speed' (YES in Step S645), the sub processing routine proceeds to Step S646, in which an image processing server ensuring the shortest time required for image processing is selected among the image processing servers 23*a*-23*c* in charge of the image processing service 3, as the most preferred server, by comparing their processing time information, which is received. After that, the sub processing routine proceeds to Step S644.

In Step S645, if it is not 'Speed', the sub processing routine proceeds to Step S647, in which it is judged whether or not 'Quality' is selected as a selection criterion. If it is 'Quality' (YES in Step S647), the sub processing routine proceeds to Step S648, in which an image processing server which would make the best match with the image forming apparatus 1 in terms of image quality is selected among the image processing servers 23*a*-23*c* in charge of the image processing service 3, as the most preferred server, by comparing their results of a test operation using a test pattern. After that, the sub processing routine proceeds to Step S644. If it is not 'Quality' (NO in Step S647), the sub processing routine returns to the last processing routine.

If 'Speed' or 'Quality' is selected as a selection criterion, the image forming server selected as the most preferred server performs its own image processing service all over again so as to provide its charge information.

In Step S644, the most preferred server and its charge information are written in the most preferred server information. After that, the sub processing routine returns to the last processing routine.

Figure 23:
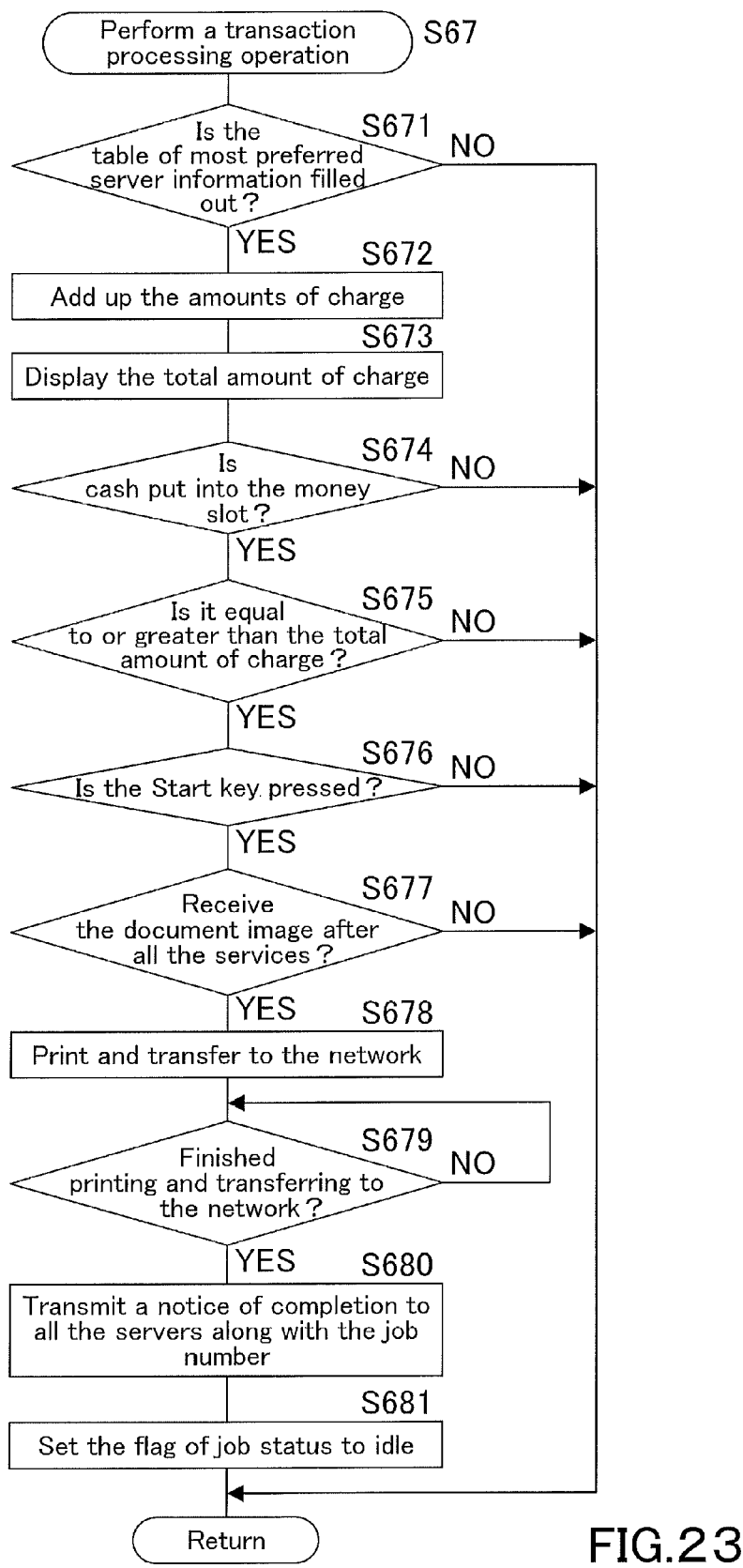
FIG. 23 is a flowchart representing a sub processing routine corresponding to a transaction processing operation (Step S67) in FIG. 21.

FIG. 23 is a flowchart representing a sub processing routine corresponding to the transaction processing operation (Step S67) in FIG. 21.

In Step S671, it is judged whether or not the table of most preferred server information is filled out. If it is not filled out yet (NO in Step S67), the sub processing routine returns to the main processing routine. If it is already filled out (YES in Step S671), the amounts of charge are added up in Step S672, and the total amount of charge is shown on the display 128b of the operation panel 128 in Step S673.

And in Step S674, it is judged whether or not cash is put into the money slot. If cash is not put into the money slot yet (NO in Step S674), the sub processing routine returns to the last processing routine. If cash is put into the money slot already (YES in Step S674), then it is judged in Step S675 whether or not the amount of money having been put into the money slot is equal to or greater than the total amount of charge. If it is less than the total amount of charge (NO in Step S675), the sub processing routine returns to the last processing routine.

If it is equal to or greater than the total amount of charge (YES in Step S675), then it is judged in Step S676 whether or not the Start key 128d is pressed. If it is not pressed (NO in Step S676), the sub processing routine returns to the last processing routine. If it is pressed (YES in Step S676), then it is judged in Step S677 whether or not the document image is received after all the image processing services.

If it is not received yet (NO in Step S677), the sub processing routine returns to the last processing routine. If it is received already (YES in Step S677), it is printed out or transferred to the network in Step S648. After that, the sub processing routine proceeds to Step S679.

In Step S679, the sub processing routine waits until the document image has been printed out or transferred to the network (YES in Step S679). If it has been printed out or transferred to the network (YES in Step S679), a notice saying that the job is completed is transmitted along with the job number to all the image processing 21a-21c, 22a-22c, 23a-23c in Step S680, and the flag of job status' is switched to 'idle' in Step S681. After that, the sub processing routine returns to the last processing routine.

In this mode of implementation, the transaction processing operation starts when cash is inserted into the transaction processing apparatus 5, or the total amount of charge may be registered in advance on the image forming apparatus 1 so that it can charge that amount to the user's terminal 31, 32, or the like.

FIGS. 24-29 are flowcharts to further describe the operations of the image processing servers 21a-21c, 22a-22c, 23a-23c. The image processing servers 21a-21c, 22a-22c, 23a-23c perform all operations under control of their own CPUs 211 according to operation programs stored on their own recording mediums such as the ROMs 212 or the memories 214.

Figure 24:
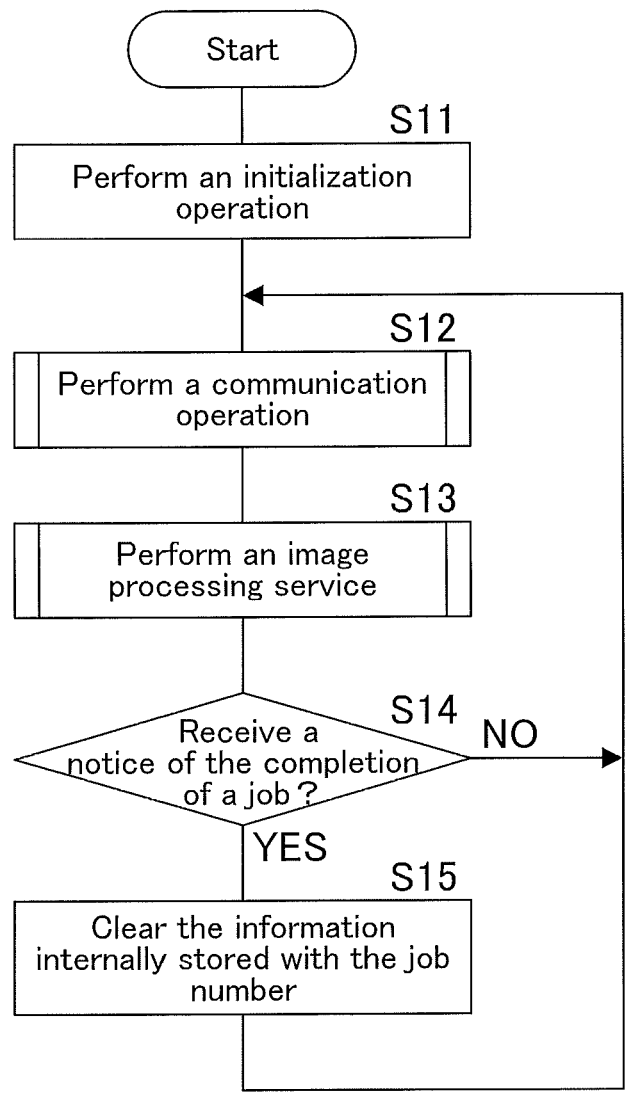
FIG. 24 is a flowchart representing a main processing routine of the image processing servers.

FIG. 24 is a flowchart representing a main processing routine of the image processing servers 21a-21c, 22a-22c, 23a-23c.

The image processing servers 21a-21c, 22a-22c, 23a-23c individually perform a program initialization operation (Step S11), a communication operation (Step S12), and an image processing operation (Step S13). After that, it is judged in Step S14 whether or not a notice saying that the job is completed is received from the image forming apparatus 1. If it is not received yet (NO in Step S14), the main processing routine returns to Step S12. If it is received already (YES in Step S14), the information stored with the job number is cleared in Step S15.

Here, the image processing servers 21a-21c, 22a-22c, 23a-23c may be configured to perform the communication operation (Step S12) and the image processing operation (Step S13) in another process.

Figure 25:
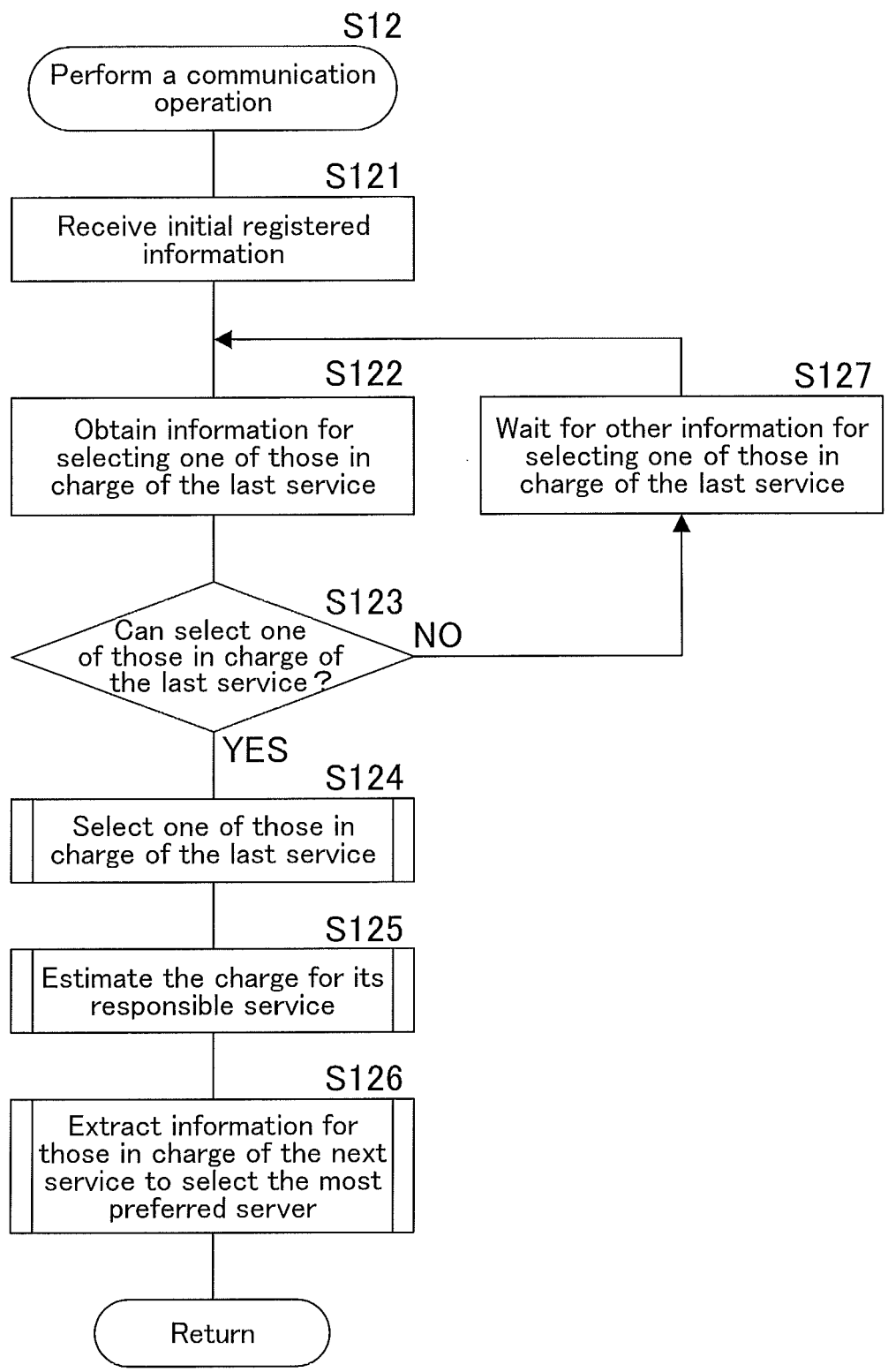
FIG. 25 is a flowchart representing a sub processing routine corresponding to a communication operation (Step S12) in FIG. 24.

FIG. 25 is a flowchart representing a sub processing routine corresponding to the communication operation (Step S12) in FIG. 24.

The present image processing server receives the initial registered information in Step S121, and further receives information for selecting one of those in charge of the last image processing service in Step S122. And in Step S123, it is judged whether or not it is enough for such a selection operation. If it is not enough (NO in Step S123), the sub processing routine waits until other information for selecting one of those in charge of the last image processing service is received in Step S127, and then returns to Step S122.

If it is enough for such a server selection operation (YES in Step S123), the present image processing server performs the server selection operation in Step S124, performs a charge estimation operation, i.e. estimates the charge for its responsible image processing service in Step S125, and further performs an operation to extract information for those in charge of the next image processing service to select the most preferred server in Step S126. After that, the sub processing routine returns to the main processing routine. Hereinafter, each of these operations will be described in more detail.

Figure 26:
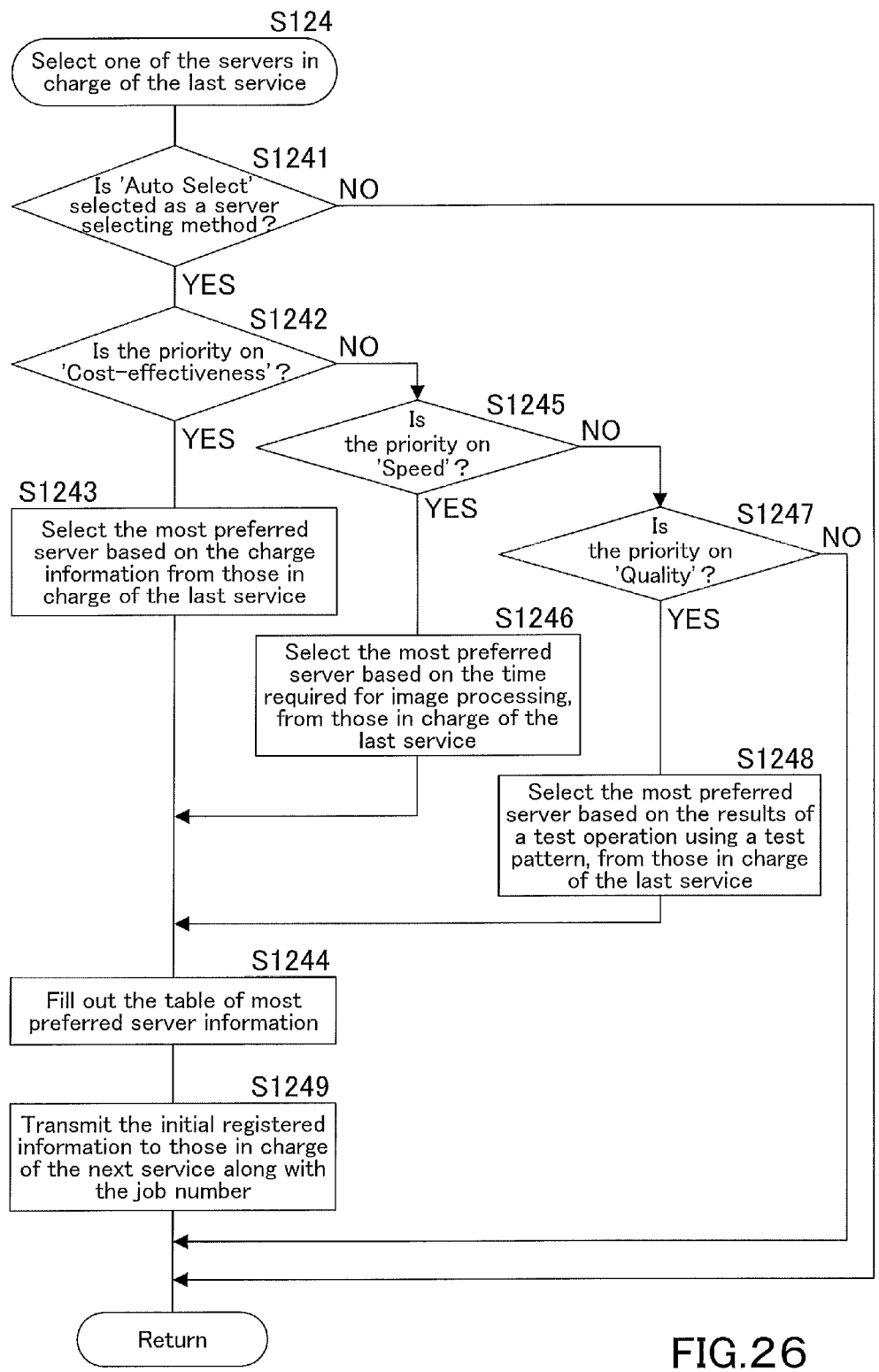
FIG. 26 is a flowchart representing a sub processing routine corresponding to a server selection operation (Step S124) in FIG. 25.

FIG. 26 is a flowchart representing a sub processing routine corresponding to the server selection operation (Step S124) in FIG. 25. In this operation, the image processing servers 21a-21c, 22a-22c, or 23a-23c individually select one of those in charge of the last image processing service, as the most preferred server.

In Step S1241, it is judged whether or not 'Auto Select' is selected as a server selecting method. If it is not 'Auto Select' (NO in Step S1241), the sub processing routine returns to the last processing routine.

If it is 'Auto Select' (YES in Step S1241), the sub processing routine proceeds to Step S1242, in which it is judged whether or not 'Cost-effectiveness' is selected as a selection criterion. If it is 'Cost-effectiveness' (YES in Step S1242), the sub processing routine proceeds to Step S1243, in which an image processing server ensuring the lowest charge is selected as the most preferred server among those in charge of the last image processing service, by comparing their charge information which is received. After that, the sub processing routine proceeds to Step S1244.

In Step S1242, if it is not 'Cost-effectiveness', the sub processing routine proceeds to Step S1245, in which it is judged whether or not 'Speed' is selected as a selection criterion. If it is 'Speed' (YES in Step S1245), the sub processing routine proceeds to Step S1246, in which an image processing server ensuring the shortest time required for image processing is selected as the most preferred server among those in charge of the last image processing service, by comparing their processing time information, which is received. After that, the sub processing routine proceeds to Step S1244.

In Step S1245, if it is not 'Speed', the sub processing routine proceeds to Step S1247, in which it is judged whether or not 'Quality' is selected as a selection criterion. If it is 'Quality' (YES in Step S1247), the sub processing routine proceeds to Step S1248, in which an image processing server which would make the best match with the present image processing server in terms of image quality, is selected as the most preferred server among those in charge of the last image processing service, by comparing their results of a test operation using a test pattern. After that, the sub processing routine proceeds to Step S1244. If it is not 'Quality' (NO in Step S1247), the sub processing routine returns to the last processing routine.

If 'Speed' or 'Quality' is selected as a selection criterion, the image processing server selected as the most preferred server performs its own image processing service all over again so as to provide its charge information.

In Step S1244, the most preferred server and the charge information are written in the most preferred server information. After that, the sub processing routine returns to the last processing routine. Subsequently, in Step S1249, the most preferred server information, the selection criteria information, and the service information, which are collectively referred to as the initial registered information, are transmitted to those in charge of the next image processing service. After that, the sub processing routine returns to the last processing routine. In the case where the present image processing server corresponds to any of the image processing servers 23a-23c, the initial registered information is transmitted to the image forming apparatus 1.

Figure 27:
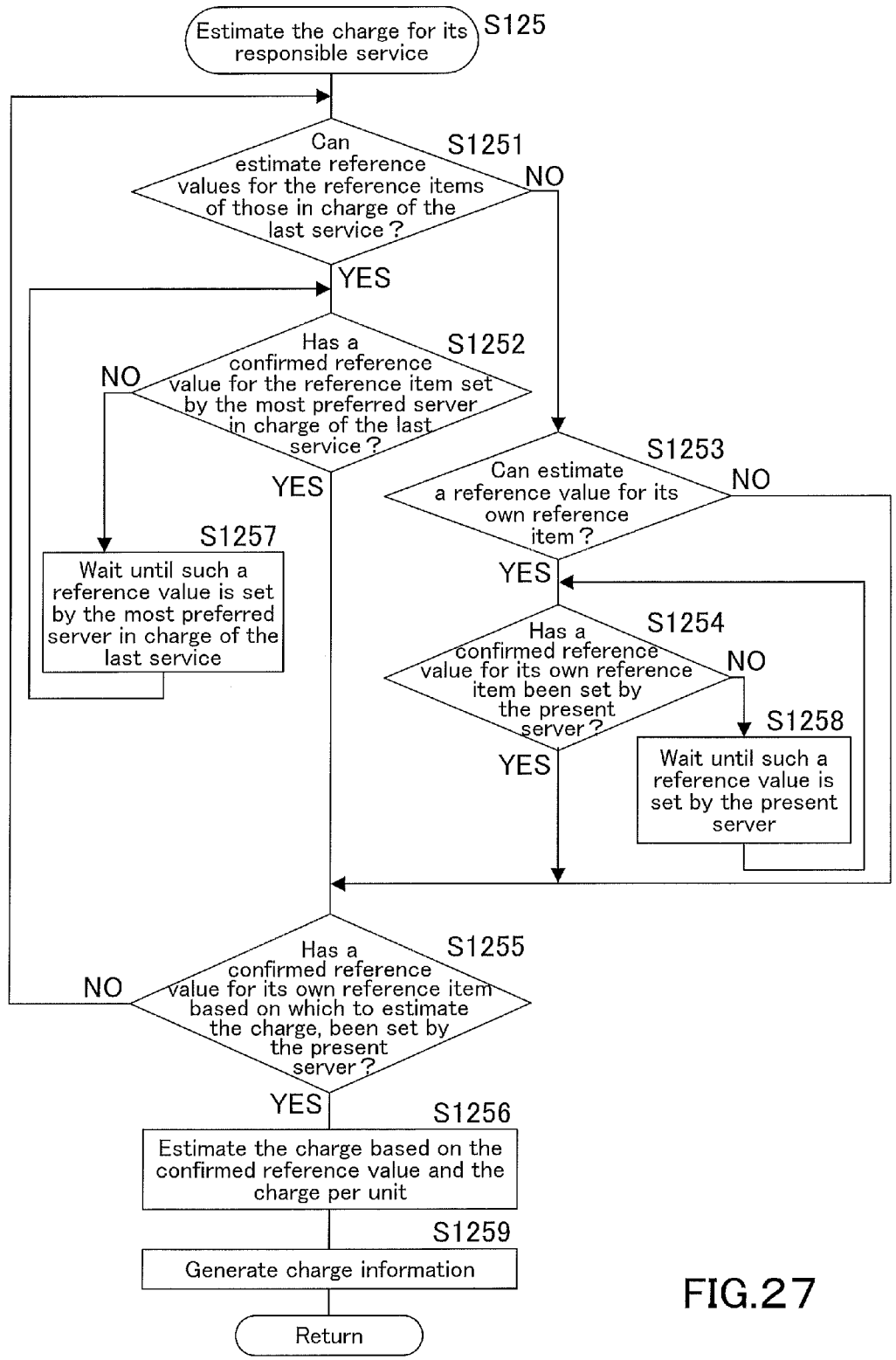
FIG. 27 is a flowchart representing a sub processing routine corresponding to a charge estimation operation (Step S125) in FIG. 25.

FIG. 27 is a flowchart representing a sub processing routine corresponding to the charge estimation operation (Step S125) in FIG. 25. In this operation, the image processing servers 21a-21c, 22a-22c, or 23a-23c individually estimate the charges for their responsible image processing services to generate charge information.

In Step S1251, it is judged whether or not the present image processing server can estimate reference values for the reference items of those in charge of the last image processing service. If it can (YES in Step S1251), then it is judged whether or not there is a confirmed reference value for the reference item, in the estimation reference information from the most preferred server in charge of the last image processing service.

If there is such a reference value already (YES in Step S1252), the sub processing routine proceeds to Step S1255. If there is not such a reference value yet (YES in Step S1252), the sub processing routine waits until it is confirmed by the most preferred server in charge of the last image processing service, and then returns to Step S1252.

In Step S1251, if the present image processing server cannot estimate reference values for the reference items of those in charge of the last image processing service (NO in Step S1251), the sub processing routine proceeds to Step S1253.

In Step S1253, it is judged whether or not the present image processing server can estimate a reference value for its own reference item. If it can (YES in Step S1253), then it is judged in Step S1254 whether or not there is a confirmed reference value for its own reference item, in the estimation reference information.

If there is such a reference value already (YES in Step S1254), the sub processing routine proceeds to Step S1255. If there is not such a reference value yet (YES in Step S1252), the sub processing routine waits until it is confirmed by the present image processing server, and then returns to Step S1254.

In this mode of implementation, the present image processing server writes a reference value for its own reference item in the estimation reference information during the image processing operation of Step S13 as to be further described below. Alternatively, if judging that there is not a confirmed reference value for its own reference item in the estimation reference information, the present image processing server may immediately return to Step S13 of the main processing routine then start this sub processing routine all over again with a confirmed reference value for its own reference item in Step S13.

In Step S1253, if the present image processing server cannot estimate a reference value for its own reference item (NO in Step S1253), the sub processing routine proceeds to Step S1255.

In Step S1255, it is judged whether or not there is a confirmed reference value for its own reference item based on which to estimate the charge, in the estimation reference information. If there is not such a reference value yet (NO in Step S1255), the sub processing routine returns to Step S1251. If there is such a reference value already (YES in Step S1255), the present image processing server estimates the charge based on the confirmed reference value and the charge per unit in Step S1256, and generates charge information indicating the estimated amount in Step S1259. And then, the sub processing routine returns to the last processing routine.

Figure 28:
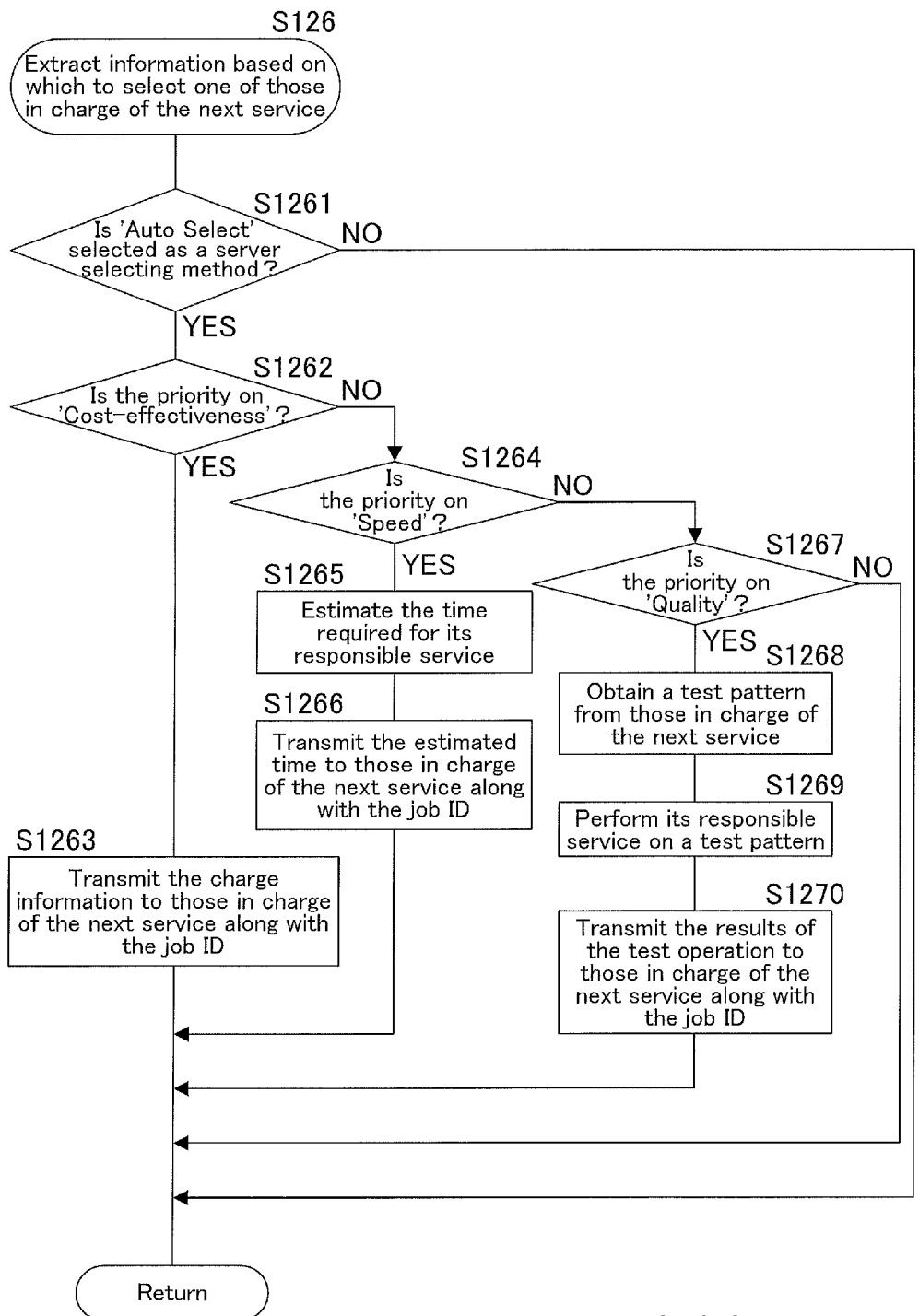
FIG. 28 is a flowchart representing a sub processing routine corresponding to an information extraction operation (Step S126) in FIG. 25.

FIG. 28 is a flowchart representing a sub processing routine corresponding to an operation to extract information for those in charge of the next image processing service to select the most preferred server (Step S126). In this operation, the present image processing server transmits to those in charge of the next image processing service: the charge information generated in Step S1259 of FIG. 27 if the priority is on cost-efficiency; the time required for image processing if the priority is on speed; or the results of a test operation using a test pattern if the priority is on quality.

In Step S1261, it is judged whether or not 'Auto Select' is selected as a server selecting method. If it is not 'Auto Select' (NO in Step S1261), the sub processing routine returns to the last processing routine.

If it is 'Auto Select' (YES in Step S1261), the sub processing routine proceeds to Step S1262, in which it is judged whether or not 'Cost-effectiveness' is selected as a selection criterion. If it is 'Cost-effectiveness' (YES in Step S1262), the charge information is transmitted to the those in charge of the next image processing service, along with the job ID. After that, the sub processing routine returns to the last processing routine.

In Step S1262, if it is not 'Cost-effectiveness', the sub processing routine proceeds to Step S1264, in which it is judged whether or not 'Speed' is selected as a selection criterion. If it is 'Speed' (YES in Step S1264), the present image processing server estimates the time required for its responsible image processing service in Step S1265, and transmits information indicating the estimated time to those in charge of the next image processing service, along with the job ID in Step S1266. After that, the sub processing routine returns to the last processing routine. And then if those in charge of the next image processing servers select the present image processing server as the most preferred server, the present image processing server will receive a notice of that. When receiving such a notice, the present image processing server performs its responsible image processing service on the document image and transmits charge information to those in charge of the next image processing service.

In Step S1264, if it is not 'Speed' (NO in Step S1264), the sub processing routine proceeds to Step S1267, in which it is judged whether or not 'Quality' is selected as a selection criterion. If it is not 'Quality' (NO in Step S1267), the sub processing routine returns to the last processing routine. If it is 'Quality' (YES in Step S1267), a test pattern is obtained from those in charge of the next image processing service in Step S1268, and an image processing service is performed on the test pattern in Step S1269. And in Step S1270, the results of a test operation using the test pattern is transmitted to those in charge of the next image processing service, along with the job ID. After that, the sub processing routine returns to the last processing routine. And then if those in charge of the next image processing service select the present image processing server as the most preferred server, the present image processing server will receive a notice of that. When receiving such a notice, the present image processing server performs its responsible image processing service on the document image and transmits charge information to those in charge of the next image processing service.

In the case where the present image processing server corresponds to any of the image processing servers 23a-23c in Step S1263, S1266, and S1270, those information objects are transmitted to the image forming apparatus 1.

Figure 29:
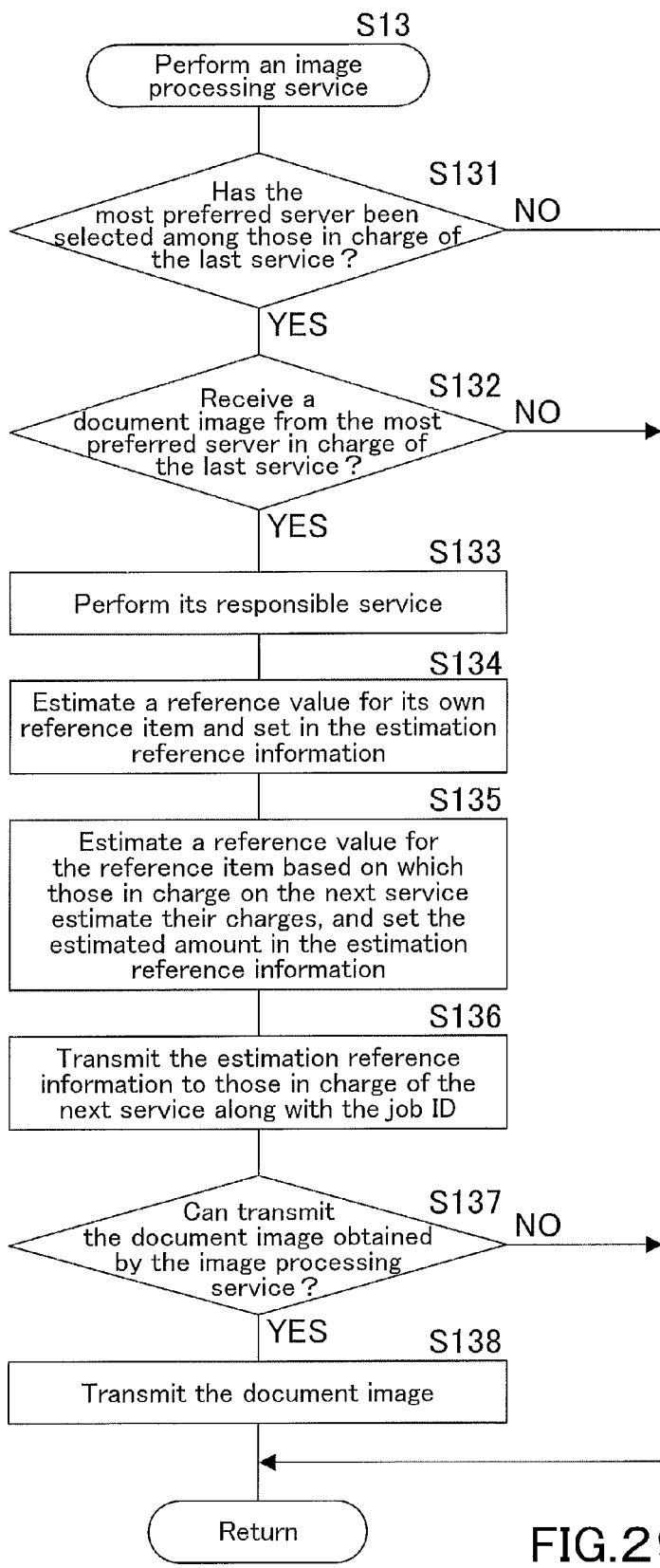
FIG. 29 is a flowchart representing a sub processing routine corresponding to an image processing operation (Step S13) in FIG. 24.

FIG. 29 is a flowchart representing a sub processing routine corresponding to the image processing operation (Step S13 in FIG. 24). In this operation, the present image processing server performs its responsible image processing service, estimates a reference value for its own reference item based on which those in charge of next image processing service estimate their charges, and writes the estimated amounts in the estimation reference information.

In Step S131, it is judged whether or not the most preferred server has been selected among those in charge of the last image processing service. If it has not been selected (NO in Step S131), the sub processing routine returns to the main processing routine. If it has been selected (YES in Step S131), then it is judged in Step S132 whether or not the document image is received. If it is not received yet (NO in Step S132), the sub processing routine returns to the main processing routine. If it is received already (YES in Step S132), the present image processing server performs its responsible image processing service on the document image.

Subsequently in Step S134, the present image processing server estimates a reference value for its own reference item and writes the estimated amount in the charge information. And in Step S135, the present image processing server estimates a reference value for the reference item based on which those in charge of the next image processing service estimate their charges, and writes the estimated amount in the estimation reference information.

And then in Step S136, the estimation reference information is transmitted to those in charge of the next image processing service, along with the job number. In the case where the present image processing server corresponds to any of the image processing servers 23a-23c, there is no need to transmit the estimation reference information to the image forming apparatus 1.

In Step S137, it is judged whether or not the document image obtained by the image processing service can be transferred to the next address. If it cannot be transferred (NO in Step S137), the sub processing routine returns to the main processing routine. If the document image can be transferred (YES in Step S137), it is transferred to those in charge of the next image processing service in Step S138, and then the sub processing routine returns to the main processing routine. In the case where the present image processing server corresponds to any of the image processing servers 23a-23c, the document image is transferred to the image forming apparatus 1.

One mode of implementing the present invention has been described in the foregoing specification, which does not mean that the present invention shall be construed as limited to the particular forms disclosed.

For example, in this mode of implementation described above, the image processing servers individually select one of those in charge of the last image processing service as the most preferred server, while performing their image processing service. Alternatively, the image processing servers individually may perform a pre-operation to estimate their charges only to select all most preferred servers, and then start to cooperatively perform a series of image processing services by transferring the document image to the most preferred servers previously selected.

And in this mode of implementation, the image forming apparatus and the image processing servers transfer a document image and information for server selection to the next address via the network. Alternatively, the image forming apparatus and the image processing servers may share necessary information using a data storage server or the like with such information being stored thereon in advance, in order to reduce communication overhead due to frequent exchange of data.

The present invention of the subject application having been described above may be applied to the following modes.

[1] An image processing system comprising: an image forming apparatus which outputs target image data; and a plurality of image processing servers which cooperatively perform a series of image processing services in a predetermined order on the target image data originated from the image forming apparatus, while being connected to the image forming apparatus, each of the image processing servers comprising:
an image processor which performs a second-order image processing service on the target image data;
a selection information obtainer which obtains server selection information from all of a plurality of image processing servers in charge of a first-order image processing service;
a server selector which selects one of those in charge of the first-order image processing service as the most preferred server based on the server selection information obtained by the selection information obtainer; and
a transmitter which transmits most preferred server information indicating the image processing server in charge of the first-order image processing service, selected as the most preferred server by the server selector; the target image data; and server selection information based on which to select one of a plurality of image processing servers in charge of the second-order image processing service as the most preferred server, to all of a plurality of image processing servers in charge of a third-order image processing service or the image forming apparatus, the image forming apparatus comprising:
a selection information obtainer which obtains server selection information from all of a plurality of image processing servers in charge of the final image processing service; and
a server selector which selects one of those in charge of the final image processing service as the most preferred server based on the server selection information obtained by the selection information obtainer.

[2] The image processing system as recited in the aforementioned mode [1], wherein the server selection information corresponds to charge information of each of the image processing servers, indicating the charge for performing its responsible image processing service on the target data, and each of the server selectors selects an image processing server ensuring the lowest charge for that, as the most preferred server based on the charge information.

[3] The image processing system as recited in the aforementioned mode [1], wherein the server selection information corresponds to processing time information of each of the image processing servers, indicating the time required for performing its responsible image processing service on the target image data, and each of the server selectors selects an image processing server ensuring the shortest time required for that, as the most preferred server based on the processing time information.

[4] The image processing system as recited in the aforementioned mode [1], wherein the server selection information corresponds to job queue information of each of the image processing servers, indicating the status of jobs in the queue for performing its responsible image processing service on the target image data, and each of the server selectors selects an image processing server holding the smallest number of jobs in the queue, as the most preferred server based on the job queue information.

[5] The image processing system as recited in the aforementioned mode [1], wherein the server selection information corresponds to test result information of each of the image processing servers, indicating the results of performing its responsible image processing service on a test image.

[6] The image processing system as recited in the aforementioned mode [5], wherein each of the server selectors selects an image processing server ensuring the lowest charge for performing its responsible image processing service on the target image, as the most preferred server based on the test result information.

[7] The image processing system as recited in the aforementioned mode [5], wherein each of the server selectors selects an image processing server ensuring the shortest time required for performing its responsible image processing service on the target image data, as the most preferred server based on the test result information.

[8] The image processing system as recited in the aforementioned mode [5], wherein each of the server selectors selects an image processing server which would make the best match with the image processing server itself in charge of the second-order image processing service, in terms of image quality, as the most preferred server based on the test result information.

[9] The image processing system as recited in the aforementioned mode [1], wherein:
the image forming apparatus further comprises a criteria setting portion which sets up a selection criterion based on which to select the most preferred server by each of the server selectors, according to user operation; and
the server selection information obtained by each of the selection information obtainers covers the selection criterion set up by the criteria setting portion, and the server selection information transmitted by the transmitter to all those in charge of the third-order image processing service or the image forming apparatus, also covers the selection criterion set up by the criteria setting portion.

[10] An image processing method for an image processing system comprising: an image forming apparatus which outputs target image data; and a plurality of image processing servers which cooperatively perform a series of image processing services in a predetermined order on the target image data originated from the image forming apparatus, while being connected to the image forming apparatus via a network, comprising:
the following steps of each of the image processing server:
performing a second-order image processing service on the target image data;
obtaining server selection information from all of a plurality of image processing servers in charge of a first-order image processing service;
selecting one of those in charge of the first-order image processing service as the most preferred server based on the server selection information obtained; and
transmitting most preferred server information indicating the image processing server in charge of the second-order image processing service, selected as the most preferred server; the target image data; and server selection information based on which to select one of a plurality of image processing servers in charge of the second-order image processing service as the most preferred server, to all of a plurality of image processing servers in charge of a third-order image processing service or the image forming apparatus, and
the following steps of the image forming apparatus:
obtaining server selection information from all of a plurality of image processing servers in charge of the final image processing service; and
selecting one of those in charge of the final image processing service as the most preferred server based on the server selection information obtained.

[11] An image processing server to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus via a network, comprising:
an image processor which performs a second-order image processing service on the target image data;
a selection information obtainer which obtains server selection information from all of a plurality of image processing servers in charge of a first-order image processing service;
a server selector which selects one of those in charge of the first-order image processing service as the most preferred server based on the server selection information obtained by the selection information obtainer; and
a transmitter which transmits most preferred server information indicating the image processing server in charge of the first-order image processing service, selected as the most preferred server by the server selector; the target image data; and server selection information based on which to select one of a plurality of image processing servers in charge of the second-order image processing service as the most preferred server, to all of a plurality of image processing servers in charge of a third-order image processing service or the image forming apparatus.

[12] The image processing server as recited in the aforementioned mode [11], wherein the server selection information corresponds to charge information of each of the image processing servers, indicating the charge for performing its responsible image processing service on the target data, and the server selector selects an image processing server ensuring the lowest charge for that, as the most preferred server based on the charge information.

[13] The image processing server as recited in the aforementioned mode [11], wherein the server selection information corresponds to processing time information of each of the image processing servers, indicating the time required for performing its responsible image processing service on the target image data, and the server selector selects an image processing server ensuring the shortest time required for that, as the most preferred server based on the processing time information.

[14] The image processing server as recited in the aforementioned mode [11], wherein the server selection information corresponds to job queue information of each of the image processing servers, indicating the status of jobs in the queue for performing its responsible image processing service on the target image data, and the server selector selects an image processing server holding the smallest number of jobs in the queue, as the most preferred server based on the job queue information.

[15] The image processing server as recited in the aforementioned mode [11], wherein the server selection information corresponds to test result information of each of the image processing servers, indicating the results of performing its responsible image processing service on a test image.

[16] The image processing server as recited in the aforementioned mode [15], wherein the server selector selects an image processing server ensuring the lowest charge for performing its responsible image processing service on the target image, as the most preferred server based on the test result information.

[17] The image processing server as recited in the aforementioned mode [15], wherein the server selector selects an image processing server ensuring the shortest time required for performing its responsible image processing service on the target image data, as the most preferred server based on the test result information.

[18] The image processing server as recited in the aforementioned mode [15], wherein the server selector selects an image processing server which would make the best match with the image processing server itself in charge of the second-order image processing service, in terms of image quality, as the most preferred server based on the test result information.

[19] An image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus via a network, comprising:
  a selection information obtainer which obtains server selection information from all of a plurality of image processing servers in charge of the final image processing service; and
  a server selector which selects one of a plurality of image processing servers in charge of the final image processing service as the most preferred server based on the server selection information obtained by the selection information obtainer.

[20] The image forming apparatus as recited in the aforementioned mode [19], wherein the server selection information corresponds to charge information of each of the image processing servers, indicating the charge for performing its responsible image processing service on the target data, and the server selector selects an image processing server ensuring the lowest charge for that, as the most preferred server based on the charge information.

[21] The image forming apparatus as recited in the aforementioned mode [19], wherein the server selection information corresponds to processing time information of each of the image processing servers, indicating the time required for performing its responsible image processing service on the target image data, and the server selector selects an image processing server ensuring the shortest time required for that, as the most preferred server based on the processing time information.

[22] The image forming apparatus as recited in the aforementioned mode [19], wherein the server selection information corresponds to job queue information of each of the image processing servers, indicating the status of jobs in the queue for performing its responsible image processing service on the target image data, and the server selector selects an image processing server holding the smallest number of jobs in the queue, as the most preferred server based on the job queue information.

[23] The image forming apparatus as recited in the aforementioned mode [19], further comprising a criteria setting portion which sets up a selection criterion based on which to select the most preferred server by the server selector selects, according to user operation, wherein the server selection information obtained by the selection information obtainer covers the selection criterion set up by the criteria setting portion.

[24] A non-transitory computer-readable recording medium with an image processing program being stored thereon to make a computer of an image processing server to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus via a network, execute:
  performing a second-order image processing service on the target image data;
  obtaining server selection information from all of a plurality of image processing servers in charge of a first-order image processing service;
  selecting one of those in charge of the first-order image processing service as the most preferred server based on the server selection information obtained; and
  transmitting most preferred server information indicating the image processing server in charge of the first-order image processing service, selected as the most preferred server; the target image data; and server selection information based on which to select one of a plurality of image processing servers in charge of the second-order image processing service as the most preferred server, to all of a plurality of image processing servers in charge of a third-order image processing service or the image forming apparatus.

[25] A non-transitory computer-readable recording medium with an image processing program being stored thereon to make a computer of an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus via a network, execute:
  obtaining server selection information from all of a plurality of image processing servers in charge of the final image processing service; and selecting one of a plurality of image processing servers in charge of the final image processing service, as the most preferred server based on the server selection information obtained.

According to the aforementioned mode of implementing the present invention [1], a plurality of image processing servers in charge of a first-order image processing service individually transfer server selection information to all of a plurality of image processing servers in charge of a second-order image processing service. Obtaining such server selection information therefrom, those in charge of the second-order image processing service individually select one of those in charge of the first-order image processing service as the most preferred server based on the server selection information. Similarly, obtaining such server selection information therefrom, the image forming apparatus selects one of those in charge of the first-order image processing service as the most preferred server based on the server selection information.

As described above, the image processing servers in charge of a second-order image processing service individually selects one of those in charge of a first-order image processing service as the most preferred server. Therefore, under the condition that a plurality of image processing servers in charge of different image processing services cooperatively perform a series of image processing services in a predetermined order on the target image data originated from the image forming apparatus, a plurality of image processing severs in charge of one image processing service individually select the most preferred server, which allows arranging one set of most preferred servers even without a need for a high-performance central server or image forming apparatus.

Furthermore, even if there is a possibility that the second-order image processing service may be adversely affected by the first-order image processing service, a right option always can be selected among those in charge of first-order image processing service, based on helpful information.

According to the aforementioned mode of implementing the present invention [2], an image processing server ensuring the lowest charge for performing its responsible image processing service is selected as the most preferred server, which allows arranging one set of most preferred servers ensuring the lowest charge for performing the entire series of image processing services.

According to the aforementioned mode of implementing the present invention [3], an image processing server ensuring the shortest time required for performing its responsible image processing service is selected as the most preferred server, which allows arranging one set of most preferred servers ensuring the shortest time required for performing the entire series of image processing services.

According to the aforementioned mode of implementing the present invention [4], an image processing server holding the smallest number of jobs in the queue is selected as the most preferred server, which allows arranging one set of more preferred image processing servers ensuring the shortest time required for performing the entire series of image processing services.

According to the aforementioned mode of implementing the present invention [5], an image processing server which showed the best performance on a test operation using a test image is selected as the most preferred server.

According to the aforementioned mode of implementing the present invention [6], an image processing server ensuring the lowest charge for performing its responsible image processing service on the target image data is selected as the most preferred server based on the test result information, which allows arranging one set of most preferred servers ensuring the lowest charge for performing the entire series of image processing services.

According to the aforementioned mode of implementing the present invention [7], an image processing server ensuring the shortest time required for performing its responsible image processing service on the target image data is selected as the most preferred server based on the test result information, which allows arranging one set of more preferred image processing servers ensuring the lowest charge for performing the entire series of image processing services.

According to the aforementioned mode of implementing the present invention [8], an image processing server which would make the best match with the present image processing server in charge of the second-order image processing service is selected as the most preferred server based on the test result information, which allows arranging one set of most preferred servers ensuring the shortest time required for performing the entire series of image processing services.

According to the aforementioned mode of implementing the present invention [9], the image forming apparatus sets up a selection criterion for server selection according to user operation so that an image processing server meeting this selection criterion will be selected as the most preferred server, which allows arranging one set of most preferred servers satisfying user preferences.

According to the aforementioned mode of implementing the present invention [10], under the condition that a plurality of image processing servers in charge of different image processing services cooperatively perform a series of image processing services in a predetermined order on the target image data originated from the image forming apparatus, a plurality of image processing servers in charge of one image processing service individually select the most preferred server, which allows arranging one set of most preferred servers even without a need for a high-performance central server or image forming apparatus.

According to the aforementioned mode of implementing the present invention [11], under the condition that a plurality of image processing servers in charge of different image processing services cooperatively perform a series of image processing services in a predetermined order on the target image data originated from the image forming apparatus, a plurality of image processing servers in charge of one image processing service individually select the most preferred server, which allows arranging one set of most preferred servers even without a need for a high-performance central server or image forming apparatus.

According to the aforementioned mode of implementing the present invention [12], the image processing server selects an image processing server ensuring the lowest charge for performing its responsible image processing service, as the most preferred server.

According to the aforementioned mode of implementing the present invention [13], the image processing server selects an image processing server ensuring the shortest time required for performing its responsible image processing service, as the most preferred server.

According to the aforementioned mode of implementing the present invention [14], the image processing server selects an image processing server holding the smallest number of jobs in the queue, as the most preferred server.

According to the aforementioned mode of implementing the present invention [15], the image processing server selects an image processing server which would make the best match with the image processing server itself, as the most preferred server based on the test result information of each of the image processing servers, indicating the results of performing its responsible image processing service on a test image.

According to the aforementioned mode of implementing the present invention [16], the image processing server selects an image processing server ensuring the lowest charge for performing its responsible image processing service on the target image data, as the most preferred server based on the test result information.

According to the aforementioned mode of implementing the present invention [17], the image processing server selects an image processing server ensuring the shortest time required for performing its responsible image processing service on the target image data, as the most preferred server based on the test result information.

According to the aforementioned mode of implementing the present invention [18], the image processing server selects an image processing server which would make the best match with the image processing server itself, as the most preferred server based on the test result information.

According to the aforementioned mode [19], under the condition that a plurality of image processing servers in charge of different image processing services cooperatively perform a series of image processing services in a predetermined order on the target image data originated from the image forming apparatus, the image forming apparatus selects the most preferred server among those in charge of the final image processing service even without a need for a high-performance central server or image forming apparatus.

According to the aforementioned mode of implementing the present invention [20], the image forming apparatus selects an image processing server ensuring the lowest charge for performing its responsible image processing service, as the most preferred server.

According to the aforementioned mode of implementing the present invention [21], the image processing server selects an image processing server ensuring the shortest time required for performing its responsible image processing service, as the most preferred server.

According to the aforementioned mode of implementing the present invention [22], the image processing server selects an image processing server holding the smallest number of jobs in the queue, as the most preferred server.

According to the aforementioned mode of implementing the present invention [23], the user sets up a selection criterion for server selection so that an image processing server meeting this selection criterion will be selected as the most preferred server, which allows arranging one set of most preferred servers satisfying user preferences.

According to the aforementioned mode of implementing the present invention [24], under the condition that a plurality of image processing servers in charge of different image processing services cooperatively perform a series of image processing services in a predetermined order on the target image data originated from the image forming apparatus, a plurality of image processing servers in charge of one image processing service individually select the most preferred server, which allows arranging one set of most preferred servers even without a need for a high-performance central server or image forming apparatus.

According to the aforementioned mode of implementing the present invention [25], under the condition that a plurality of image processing servers in charge of different image processing services cooperatively perform a series of image processing services in a predetermined order on the target image data originated from the image forming apparatus, the image forming apparatus selects the most preferred server among those in charge of the final image processing service even without a need for a high-performance central server or image forming apparatus, by controlling the computer of the image forming apparatus.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system including: an image forming apparatus; and a plurality of image processing servers which cooperatively perform a series of image processing services in a predetermined order on target image data while being connected to the image forming apparatus, the image forming apparatus comprising:
an output portion which outputs the target image data, order information indicating the order of performing a series of image processing services, and specific information to specify each of the image processing servers to each of the image processing servers that performs a first-order image processing service, each of a first group of the image processing servers which performs the first-order image processing service comprising:
a transmitter which transmits said target image data, said order information, said specific information, and a server selection information based on which to select one of a plurality of the first group of the image processing servers as the most preferred server to all of a plurality of image processing servers in charge of a second-order image processing service, each of a second group of the image processing servers which performs a n-th-order (n≥2) image processing service comprising:
a selection information obtainer which obtains server selection information from all of a plurality of image processing servers in charge of a (n−1)-th-order image processing service;
a server selector which selects one of the servers in charge of the (n−1)-th-order image processing service as the most preferred server based on the server selection information obtained by the selection information obtainer; and
a transmitter which transmits most preferred server information indicating the image processing server in charge of the (n−1)-th-order image processing service, selected by the server selector; most preferred server information indicating each of the image processing server in charge of the order from the first to a (n−2)-th-order image processing service when the selected image processing server by the server selector is in charge of the order after the second; the target image data; and server selection information based on which to select one of a plurality of image processing servers in charge of a n-th-order image processing service as the most preferred server, to all of a plurality of image processing servers in charge of a (n+1)-th-order image processing service or the image forming apparatus, the image forming apparatus further comprising:
a selection information obtainer which obtains server selection information from all of a plurality of image processing servers in charge of the final image processing service; and
a server selector which selects one of the servers in charge of the final image processing service as the most preferred server based on the server selection information obtained by the selection information obtainer.

2. The image processing system as recited in claim 1, wherein the server selection information corresponds to charge information of each of the image processing servers, indicating the charge for performing its responsible image processing service on the target data, and each of the server selectors selects an image processing server ensuring the lowest charge for that, as the most preferred server based on the charge information.

3. The image processing system as recited in claim 1, wherein the server selection information corresponds to processing time information of each of the image processing servers, indicating the time required for performing its responsible image processing service on the target image data, and each of the server selectors selects an image processing server ensuring the shortest time required for that, as the most preferred server based on the processing time information.

4. The image processing system as recited in claim 1, wherein the server selection information corresponds to job queue information of each of the image processing servers, indicating the status of jobs in the queue for performing its responsible image processing service on the target image data, and each of the server selectors selects an image processing server holding the smallest number of jobs in the queue, as the most preferred server based on the job queue information.

5. The image processing system as recited in claim 1, wherein the server selection information corresponds to test result information of each of the image processing servers, indicating the results of performing its responsible image processing service on a test image.

6. The image processing system as recited in claim 5, wherein each of the server selectors selects an image processing server ensuring the lowest charge for performing its responsible image processing service on the target image, as the most preferred server based on the test result information.

7. The image processing system as recited in claim 5, wherein each of the server selectors selects an image processing server ensuring the shortest time required for performing its responsible image processing service on the target image data, as the most preferred server based on the test result information.

8. The image processing system as recited in claim 5, wherein each of the server selectors selects an image processing server which would make the best match with the present image processing server in charge of the second-order image processing service, as the most preferred server based on the test result information.

9. The image processing system as recited in claim 1, wherein:
the image forming apparatus further comprises a criteria setting portion which sets up a selection criterion based on which to select the most preferred server by each of the server selectors, according to user operation; and
the server selection information obtained by each of the selection information obtainers covers the selection criterion set up by the criteria setting portion, and the server selection information transmitted by the transmitter to all those in charge of the third-order image processing service or the image forming apparatus, also covers the selection criterion set up by the criteria setting portion.

10. An image processing method for an image processing system including: an image forming apparatus; and a plurality of image processing servers which cooperatively perform a series of image processing services in a predetermined order on target image data while being connected to the image forming apparatus via a network, comprising:
outputting the target image data, order information indicating the order of performing a series of image processing services, and specific information to specify each of the image processing servers to each of the image processing servers that performs a first-order image processing service; and
each of the image processing servers transmits said target image data, said order information, said specific information, and a server selection information based on which to select one of a plurality of the first group of the image processing servers as the most preferred server to all of a plurality of image processing servers in charge of a second-order image processing service;
each of a second group of the image processing servers which performs a n-th-order (n≥2) image processing service:
obtains server selection information from all of a plurality of image processing servers in charge of a (n−1)-th-order image processing service;
selects one of the servers in charge of the (n−1)-th-order image processing service as the most preferred server based on the obtained server selection information; and
transmits most preferred server information indicating the image processing server in charge of the (n−1)-th-order image processing service selected by the server selector; most preferred server information indicating each of the image processing servers in charge of the order from the first to a (n−2)-th-order image processing service when the selected image processing server is in charge of the order after the second; the target image data; and server selection information based on which to select one of a plurality of image processing servers in charge of a n-th-order image processing service as the most preferred server, to all of a plurality of image processing servers in charge of a (n+1)-th-order image processing service or the image forming apparatus; and the image forming apparatus:
obtains server selection information from all of a plurality of image processing servers in charge of the final image processing service; and
selects one of those in charge of the final image processing service as the most preferred server based on the server selection information obtained.

11. In an image processing system including an image forming apparatus and a plurality of image processing servers which cooperatively perform a series of image processing services in a predetermined order on target image data, while being connected to the image forming apparatus via a network, the plurality of image processing servers comprising a first group of the image processing servers which perform a first order image processing service, and a second group of the image processing servers which perform an n-the-order (n≥2) image processing service;

each of the plurality of image processing servers comprising:

a selection information obtainer which obtains server selection information from all of the plurality of image processing servers that are in charge of a (n−1)-the-order image processing service;

a server selector which selects one of the servers in charge of the (n−1)-the-order image processing service as the most preferred server based on the server selection information obtained by the selection information obtainer; and a transmitter which transmits most preferred server information indicating the image processing server in charge of the (n−1)-the-order image processing service, selected by the server selector; most preferred server information indicating each of the image processing server in charge of the order from the first to a (n−2)-the-order image processing service when the selected image processing server by the server selector is in charge of the order after the second; the target image data; and server selection information based on which to select one of a plurality of image processing servers in charge of a n-the-order image processing service as the most preferred server, to all of a plurality of image processing servers in charge of a (n+1)-the-order image processing service or the image forming apparatus.

12. The image processing server as recited in claim 11, wherein the server selection information corresponds to charge information of each of the image processing servers, indicating the charge for performing its responsible image processing service on the target data, and the server selector selects an image processing server ensuring the lowest charge for that, as the most preferred server based on the charge information.

13. The image processing server as recited in claim 11, wherein the server selection information corresponds to processing time information of each of the image processing servers, indicating the time required for performing its responsible image processing service on the target image data, and the server selector selects an image processing server ensuring the shortest time required for that, as the most preferred server based on the processing time information.

14. The image processing server as recited in claim 11, wherein the server selection information corresponds to job queue information of each of the image processing servers, indicating the status of jobs in the queue for performing its responsible image processing service on the target image data, and the server selector selects an image processing server holding the smallest number of jobs in the queue, as the most preferred server based on the job queue information.

15. The image processing server as recited in claim 11, wherein the server selection information corresponds to test result information of each of the image processing servers, indicating the results of performing its responsible image processing service on a test image.

16. The image processing server as recited in claim 15, wherein the server selector selects an image processing server ensuring the lowest charge for performing its responsible image processing service on the target image, as the most preferred server based on the test result information.

17. The image processing server as recited in claim 15, wherein the server selector selects an image processing server ensuring the shortest time required for performing its responsible image processing service on the target image data, as the most preferred server based on the test result information.

18. The image processing server as recited in claim 15, wherein the server selector selects an image processing server which would make the best match with the present image processing server in charge of the second-order image processing service, as the most preferred server based on the test result information.

19. A non-transitory computer-readable recording medium with an image processing program being stored thereon to make a computer of an image processing server to be employed in an image processing system including an image forming apparatus; and a plurality of image processing servers which cooperatively perform a series of image processing services in a predetermined order on the target image data originated from the image forming apparatus, while being connected to the image forming apparatus via a network, execute:

outputting the target image data, order information indicating the order of performing a series of image processing services, and specific information to specify each of the image processing servers to each of the image processing servers that performs a first-order image processing service; and each of the image processing servers transmits said target image data, said order information, said specific information, and a server selection information based on which to select one of a plurality of the first group of the image processing servers as the most preferred server to all of a plurality of image processing servers in charge of a second-order image processing service;

each of a second group of the image processing servers which performs a n-th-order (n≥2) image processing service:

obtains server selection information from all of a plurality of image processing servers in charge of a (n−1)-th-order image processing service;

selects one of the servers in charge of the (n−1)-th-order image processing service as the most preferred server based on the obtained server selection information; and transmits most preferred server information indicating the image processing server in charge of the (n−1)-th-order image processing service selected by the server selector; most preferred server information indicating each of the image processing servers in charge of the order from the first to a (n−2)-th-order image processing service when the selected image processing server is in charge of the order after the second; the target image data; and server selection information based on which to select one of a plurality of image processing servers in charge of a n-th-order image processing service as the most preferred server, to all of a plurality of image processing servers in charge of a (n+1)-th-order image processing service or the image forming apparatus.

\* \* \* \* \*